(12) United States Patent
Fujiwara

(10) Patent No.: US 9,995,349 B2
(45) Date of Patent: Jun. 12, 2018

(54) ROTATION TRANSMISSION DEVICE AND WIND POWER GENERATION DEVICE EQUIPPED WITH THE SAME

(71) Applicant: JTEKT CORPORATION, Osaka-shi, Osaka (JP)

(72) Inventor: Hideki Fujiwara, Kitakatsuragi-gun (JP)

(73) Assignee: JTEKT CORPORATION, Osaka (JP)

( * ) Notice: Subject to any disclaimer, the term of this patent is extended or adjusted under 35 U.S.C. 154(b) by 63 days.

(21) Appl. No.: 14/909,684

(22) PCT Filed: Aug. 11, 2014

(86) PCT No.: PCT/JP2014/071187
§ 371 (c)(1),
(2) Date: Feb. 2, 2016

(87) PCT Pub. No.: WO2015/022934
PCT Pub. Date: Feb. 19, 2015

(65) Prior Publication Data
US 2016/0195145 A1  Jul. 7, 2016

(30) Foreign Application Priority Data

Aug. 12, 2013 (JP) .................. 2013-167421
Aug. 12, 2013 (JP) .................. 2013-167449

(51) Int. Cl.
*G01L 3/00* (2006.01)
*F16D 41/063* (2006.01)
(Continued)

(52) U.S. Cl.
CPC ............ *F16D 41/063* (2013.01); *F03D 9/25* (2016.05); *F03D 15/00* (2016.05); *F16D 41/07* (2013.01);
(Continued)

(58) Field of Classification Search
CPC ....... G01L 25/003; G01L 25/00; G01L 5/161; G01L 3/24; G01P 21/00; F16D 41/063;
(Continued)

(56) References Cited

U.S. PATENT DOCUMENTS 3,858,443 A * 1/1975 Roberts, III ............ G01L 3/105
73/862.331
5,601,167 A * 2/1997 Kinoshita ............... F16D 41/07
188/82.8
(Continued)

FOREIGN PATENT DOCUMENTS

CN 101144752 A 3/2008
EP 2 498 076 A1 9/2012
(Continued)

OTHER PUBLICATIONS

Nov. 4, 2014 Search Report issued in International Patent Application No. PCT/JP2014/071187.
(Continued)

*Primary Examiner* — Manish S Shah
*Assistant Examiner* — Nigel Plumb
(74) *Attorney, Agent, or Firm* — Oliff PLC

(57) ABSTRACT

A rotation transmission device includes a one-way clutch which is provided between an output shaft of a speed increaser and an input shaft of a generator, which makes a connection between the output shaft and the input shaft to be rotatable integrally in a state in which a rotation speed of the output shaft is higher than that of the input shaft, and which cuts off the connection between the output shaft and the input shaft in a state in which the rotation speed of the output shaft is lower than that of the input shaft. The rotation transmission device further includes: a measurement section which measures a state of the one-way clutch which changes depending on a load exerted to the one-way clutch; and an
(Continued)

acquisition section which acquires the load exerted to the one-way clutch on a basis of a measurement result of the measurement section.

16 Claims, 12 Drawing Sheets

(51) Int. Cl.

| | |
|---|---|
| *F16D 41/07* | (2006.01) |
| *F03D 15/00* | (2016.01) |
| *F16D 48/00* | (2006.01) |
| *H02K 7/00* | (2006.01) |
| *H02K 7/18* | (2006.01) |
| *G01M 13/02* | (2006.01) |
| *F03D 9/25* | (2016.01) |
| *F16C 41/00* | (2006.01) |
| *F16C 19/28* | (2006.01) |
| *F16C 33/58* | (2006.01) |
| *F16D 41/06* | (2006.01) |
| *G01L 5/00* | (2006.01) |

(52) U.S. Cl.
CPC ............ *F16D 48/00* (2013.01); *G01M 13/022* (2013.01); *H02K 7/003* (2013.01); *H02K 7/183* (2013.01); *F05B 2260/403* (2013.01); *F16C 19/28* (2013.01); *F16C 33/581* (2013.01); *F16C 41/001* (2013.01); *F16C 2360/31* (2013.01); *F16D 2041/0603* (2013.01); *G01L 5/0019* (2013.01); *G01L 5/0023* (2013.01); *G01L 5/0042* (2013.01); *G01L 5/0071* (2013.01); *Y02E 10/72* (2013.01)

(58) Field of Classification Search
CPC .......... F16D 41/25; F16D 48/00; F03D 15/00; F05B 2260/403; F16C 19/28
USPC ............. 73/862.08, 862.041, 862, 1.08, 1.01
See application file for complete search history.

(56) References Cited

U.S. PATENT DOCUMENTS

| | | | |
|---|---|---|---|
| 2004/0108732 A1* | 6/2004 | Weitkamp | F03D 7/042 290/55 |
| 2007/0030162 A1* | 2/2007 | Okada | F16C 19/52 340/682 |
| 2010/0051402 A1* | 3/2010 | Yamamoto | F16D 41/067 192/45.011 |
| 2012/0201679 A1* | 8/2012 | Heidenreich | F03D 11/02 416/146 R |
| 2013/0062886 A1* | 3/2013 | Fujiwara | F16D 7/10 290/1 C |
| 2014/0046614 A1 | 2/2014 | Pettersson | |
| 2014/0102845 A1 | 4/2014 | Yamamoto | |
| 2015/0061436 A1 | 3/2015 | Fujiwara et al. | |

FOREIGN PATENT DOCUMENTS

| | | |
|---|---|---|
| JP | S61-239138 A | 10/1986 |
| JP | 2004-036612 A | 2/2004 |
| JP | 3645964 B2 | 5/2005 |
| JP | 2013-060825 A | 4/2013 |

OTHER PUBLICATIONS

Feb. 16, 2017 Extended Search Report issued in European Patent Application No. 14836065.4.
Jan. 26, 2018 Office Action issued in Chinese Patent Application No. 201480044067.3.

* cited by examiner

ROTATION TRANSMISSION DEVICE AND WIND POWER GENERATION DEVICE EQUIPPED WITH THE SAME

TECHNICAL FIELD

An aspect of the present invention relates to a rotation transmission device and a wind power generation device equipped with the rotation transmission device.

BACKGROUND ART

Conventionally, a wind power generation device is known in which, upon receiving wind power, blades rotate a main spindle connected thereto, and a speed increaser increases the rotation of the main spindle, thereby driving a generator. In addition, a technology is also known in which a one-way clutch is provided between the output shaft of a speed increaser and the input shaft of a generator to suppress the change in the inertia torque of the generator due to the change in wind power or the like and to reduce the load exerted to the speed increaser (for example, refer to Patent Document 1).

This one-way clutch is equipped with an inner ring provided on one side of an output shaft and an input shaft, an outer ring provided on the other side and rollers disposed in wedge-shaped spaces formed between the inner ring and the outer ring, the one-way clutch being configured such that, in the case that the rotation speed of the output shaft is higher than the rotation speed of the input shaft, the rollers are moved to narrower regions in the wedge-shaped spaces and are engaged with the inner ring and the outer ring, thereby connecting the output shaft to the input shaft so as to be rotatable integrally and being configured such that, in the case that the rotation speed of the output shaft is lower than the rotation speed of the input shaft, the rollers are moved to wider regions in the wedge-shaped spaces and are released from the engagement, thereby cutting off the connection between the output shaft and the input shaft.

RELATED ART DOCUMENTS

Patent Documents

Patent Document 1: JP-A-2013-60825

SUMMARY OF THE INVENTION

Problem to be Solved by the Invention

However, even if the one-way clutch is provided between the speed increaser and the generator, since the load exerted to the speed increaser is still large, the speed increaser is one of the devices that may be likely to cause problems. Furthermore, if a large load is exerted to the speed increaser, a large load is also exerted to the one-way clutch similarly, whereby there is a high possibility of the occurrence of problems. Hence, it is desirable that the state of the loads exerted to the speed increaser and the one-way clutch should be grasped to prevent the occurrence of problems.

Moreover, if the inner peripheral face of the outer ring and the outer peripheral face of the inner ring (these are hereafter referred to as "engaged faces") with which the rollers are engaged are worn due to long-term use of the wind power generation device, the angle (wedge angle) formed by the engaged faces of the inner ring and the outer ring in the wedge-shaped space becomes large gradually and "slipping" is liable to occur between the outer ring and the inner ring. Such "slipping" may cause improper drive power transmission and deterioration in power generation efficiency. For this reason, it is important to grasp the abrasion state of the engaged faces and to prevent the deterioration in power generation efficiency.

An aspect of the present invention is intended to provide a rotation transmission device capable of grasping the loads exerted to a speed increaser and a one-way clutch so as to be useful, for example, for preventing the occurrence of problems and for early detection of problems and to provide a wind power generation device equipped with the rotation transmission device.

Another aspect of the present invention is intended to provide a rotation transmission device capable of grasping the abrasion state of the engaged faces of the inner ring and the outer ring of a one-way clutch and to provide a wind power generation device equipped with the rotation transmission device.

Means for Solving the Problem (1) A first aspect of the present invention includes a rotation transmission device including: a one-way clutch which is provided between an output shaft of a speed increaser which increases rotation of a main spindle in a wind power generation device and an input shaft of a generator to which rotation of the output shaft is input so as to generate electric power, which makes a connection between the output shaft and the input shaft so as to be rotatable integrally in a state in which a rotation speed of the output shaft is higher than a rotation speed of the input shaft, and which cuts off the connection between the output shaft and the input shaft in a state in which the rotation speed of the output shaft is lower than the rotation speed of the input shaft; a measurement section which measures a state of the one-way clutch which changes depending on a load exerted to the one-way clutch; and an acquisition section which acquires the load exerted to the one-way clutch on a basis of a measurement result of the measurement section.

With this configuration, the measurement section measures the state of the one-way clutch and the acquisition section acquires the load exerted to the one-way clutch on the basis of the measurement result of the measurement section, whereby the state of the loads exerted to the one-way clutch and the speed increaser can be grasped. Hence, in the case that the acquisition section acquires an excessive load, it is possible to take countermeasures for preventing problems from occurring in the one-way clutch and the speed increaser.

(2) The one-way clutch may include: an inner ring and an outer ring; and a plurality of engagement elements disposed between the inner ring and the outer ring, the engagement elements may be engaged with the inner ring and the outer ring to make the connection between the output shaft and the input shaft so as to be rotatable integrally, and be released from engagement to cut off the connection, and the measurement section may measure a distortion generated in the inner ring or the outer ring by the engagement of the engagement elements.

The load (torque load) exerted to the one-way clutch in the circumferential direction is related to the distortion generated in the inner ring or the outer ring. Hence, the load exerted to the one-way clutch can be acquired by measuring the distortion using the measurement section.

(3) The one-way clutch may include: an inner ring and an outer ring; and a plurality of engagement elements disposed between the inner ring and the outer ring, the engagement elements may be engaged with the inner ring and the outer ring to make the connection between the output shaft and the input shaft so as to be rotatable integrally, and be released from engagement to cut off the connection, and the measurement section may measure a movement amount of the engagement element in a circumferential direction when the engagement element is engaged with inner ring and the outer ring.

The load (torque load) exerted to the one-way clutch in the circumferential direction is related to the movement amount of the engagement element in the circumferential direction when the engagement element is engaged with inner ring and the outer ring. Hence, the load exerted to the one-way clutch can be acquired by measuring the movement amount.

(4) The one-way clutch may include cam faces on an inner peripheral face of the outer ring or an outer peripheral face of the inner ring to form wedge-shaped spaces between the inner ring and the outer ring.

In this case, when the engagement element is engaged with the cam face, a load is exerted to the cam face in the normal direction, and a distortion due to the load occurs in the outer ring or the inner ring on which the cam face is formed. The load and distortion become larger as the load exerted to the one-way clutch in the circumferential direction is larger. Hence, the load exerted to the one-way clutch in the circumferential direction can be acquired by measuring the distortion.

Furthermore, the engagement element is moved in the circumferential direction in the process of being engaged with the cam face. The movement amount becomes larger as the load exerted to the one-way clutch in the circumferential direction is larger. Hence, the load exerted to the one-way clutch in the circumferential direction can be acquired by measuring the movement amount.

(5) The one-way clutch may include sprags serving as the engagement elements.

In this case, each sprag is moved in the circumferential direction in the process of being engaged with the cam face. The movement amount becomes larger as the load exerted to the one-way clutch in the circumferential direction is larger. Hence, the load exerted to the one-way clutch in the circumferential direction can be acquired by measuring the movement amount.

(6) A second aspect of the present invention includes a wind power generation device including: a speed increaser which increases rotation of a main spindle rotated by wind power, and which outputs the rotation from an output shaft; a generator to which the rotation of the output shaft is input through an input shaft thereof to generate electric power; the above-mentioned rotation transmission device; and a measurement section which measures an electric load of the generator depending on the load acquired by the acquisition section of the rotation transmission device.

With this configuration, for example, in the case that the load exerted to the one-way clutch is large, the electric load in the generator is reduced, whereby the load exerted to the one-way clutch can be decreased and problems can be prevented from occurring in the one-way clutch and the speed increaser.

(7) The above-mentioned wind power generation device preferably includes a transmission section which transmits information indicating the state of the one-way clutch or information indicating the load exerted to the one-way clutch to an outside of the wind power generation device.

With this configuration, for example, in the case that the wind power generation device is equipped with an operation monitoring device for monitoring the wind power generation device from the outside, the state of the loads exerted to the one-way clutch and the speed increaser, the adjustment state of the electric load, etc. can be grasped remotely by transmitting the state of the one-way clutch and the load exerted to the one-way clutch to the operation monitoring device.

(8) A third aspect of the present invention includes a rotation transmission device including a one-way clutch which is provided between an output shaft of a speed increaser which increases rotation of a main spindle rotated by wind power and which outputs the rotation from the output shaft and an input shaft of a generator to which the rotation of the output shaft is input so as to generate electric power, wherein the one-way clutch includes: an inner ring provided on one of the output shaft and the input shaft; an outer ring provided on the other of the output shaft and the input shaft; and rollers disposed in wedge-shaped spaces between the inner ring and the outer ring, wherein the one-way clutch makes a connection between the output shaft and the input shaft so as to be rotatable integrally by engaging the rollers with the inner ring and the outer ring in a case in which a rotation speed of the output shaft is higher than a rotation speed of the input shaft, and cuts off the connection by releasing engagement in a case in which the rotation speed of the output shaft is lower than the rotation speed of the input shaft, and wherein the rotation transmission device further includes a detection mechanism which detects a torsion angle between the inner ring and the outer ring caused by a change in a load torque of the generator.

When the rotation of the output shaft is transmitted to the input shaft via the one-way clutch and the rotor of the generator is rotated to generate electric power, if the load torque for rotating the rotor increases, the roller of the one-way clutch is moved to the narrower region of the wedge-shaped space and relative rotation occurs between the inner ring and the outer ring during the movement. The "torsion angle" serving as the angle of the relative movement becomes larger as the wedge angle increases due to the abrasion of the engaged faces of the inner ring and the outer ring. Hence, the abrasion state of the engaged faces of the inner ring and the outer ring can be grasped by detecting the torsion angle, whereby countermeasures such as the replacement, repair, etc. of the one-way clutch can be carried out before power generation efficiency becomes low.

(9) The rotation transmission device may further include a determination section which determines an abrasion state of the inner ring and the outer ring of the one-way clutch on a basis of the torsion angle depending on a change amount of the load torque.

With this configuration, the countermeasures such as the replacement, repair, etc. of the one-way clutch can be carried out on the basis of the determination result of the determination section.

(10) The detection mechanism may include: a first detection section which detects an absolute angle of the inner ring; a second detection section which detects an absolute angle of the outer ring; and a calculation section which obtains a difference between detection values of the first and second detection sections.

With this configuration, the torsion angle between the inner ring and the outer ring can be detected.

(11) Furthermore, the detection mechanism may include a detection section which directly detects a change in an angle due to a relative rotation between the inner ring and the outer ring.

With this configuration, the torsion angle between the inner ring and the outer ring can also be detected. In addition, since the number of the detection sections can be reduced, the detection mechanism can be configured inexpensively.

(12) The rotation transmission device may include a transmission section which transmits a determination result of the determination section to an outside of the wind power generation device.

With this configuration, for example, in the case that the wind power generation device is equipped with an operation monitoring device for monitoring the wind power generation device from the outside, the abrasion state of the inner ring and the outer ring, for example, can be grasped remotely by transmitting the determination result of the determination section to the operation monitoring device.

(13) A fourth aspect of the present invention includes a wind power generation device including: a speed increaser which increases rotation of a main spindle rotated by wind power, and which outputs the rotation from the output shaft thereof; a generator to which the rotation of the output shaft is input through an input shaft thereof to generate electric power; and the above-mentioned rotation transmission device.

Advantages of the Invention

With an aspect of the present invention, the loads exerted to the speed increaser and the one-way clutch can be grasped, and this feature is useful for preventing the occurrence of problems and for early detection of problems.

With another aspect of the present invention, the abrasion state of the outer ring and the inner ring of the one-way clutch can be grasped.

MODE FOR CARRYING OUT THE INVENTION

Embodiments according to the present invention will be described below referring to the accompanying drawings.

First Embodiment

Figure 1:
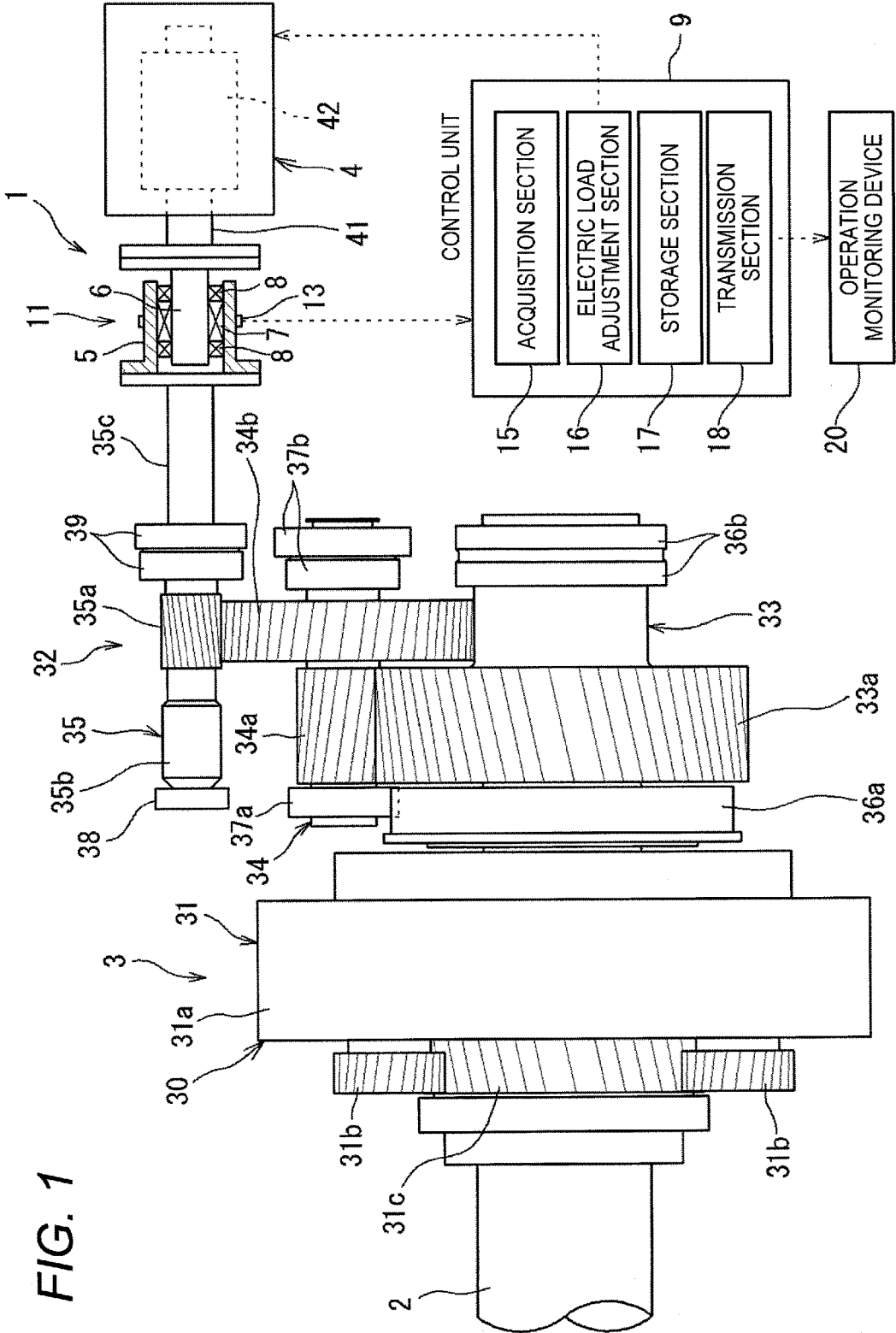
FIG. 1 is a schematic side view showing a wind power generation device according to a first embodiment of the present invention.

FIG. 1 is a schematic side view showing a wind power generation device according to a first embodiment of the present invention. This wind power generation device (power generation device) 1 is equipped with a main spindle 2 that is rotated by receiving wind power (external force), a speed increaser 3 connected to this main spindle 2, a generator 4 connected to this speed increaser 3 and a control unit 9 for controlling the operation of this generator 4, wherein the generator 4 is driven in a state in which the rotation of the main spindle 2 is increased by the speed increaser 3.

To the tip end section of the main spindle 2, for example, blades (not shown) are connected so as to be rotatable integrally therewith, and the blades are designed so as to rotate together with the main spindle 2 upon receiving wind power.

The generator 4 has the drive shaft (input shaft) 41 that is rotated when the rotation increased by the speed increaser 3 is input thereto, a rotor 42 incorporated in the generator 4, a stator, not shown, etc. The rotor 42 is connected to the drive shaft 41 so as to be rotatable integrally therewith, and the drive shaft 41 rotates to drive the rotor 42, thereby generating electric power.

The speed increaser 3 is equipped with a gear mechanism (rotation transmission mechanism) 30 to which the rotation of the main spindle 2 is input and in which the rotation is increased. This gear mechanism 30 is equipped with a planetary gear mechanism 31 and a high speed stage gear mechanism 32 to which the rotation increased by the planetary gear mechanism 31 is input and in which the rotation is further increased.

The planetary gear mechanism 31 has an internal gear (ring gear) 31a, a plurality of planetary gears 31b being held by a planetary carrier (not shown) that is connected to the main spindle 2 so as to be rotatable integrally therewith, and a sun gear 31c engaged with the planetary gears 31b. With this configuration, when the planetary carrier is rotated together with the main spindle 2, the sun gear 31c is rotated via the planetary gears 31b, and the rotation is transmitted to the low-speed shaft 33 of the high speed stage gear mechanism 32.

The high speed stage gear mechanism 32 is equipped with the low-speed shaft 33 having a low-speed gear 33a, an intermediate shaft 34 having a first intermediate gear 34a and a second intermediate gear 34b, and the output shaft 35 having a high-speed gear 35a.

The low-speed shaft 33 is formed of a large rotation shaft having a diameter of approximately 1 m, for example, and is disposed coaxially with the main spindle 2. Both the end sections of the low-speed shaft 33 in the axial direction are rotatably supported by roller bearings 36a and 36b.

The intermediate shaft 34 is disposed above the low-speed shaft 33, and both the end sections of the intermediate shaft in the axial direction are rotatably supported by roller bearings 37a and 37b. The first intermediate gear 34a of the intermediate shaft 34 is engaged with the low-speed gear 33a, and the second intermediate gear 34b is engaged with the high-speed gear 35a.

The output shaft 35 is disposed above the intermediate shaft 34 and designed to output a rotation torque. The one end section 35b and the other end section (output end section) 35c of the output shaft 35 in the axial direction are rotatably supported by roller bearings 38 and 39, respectively.

With the above-mentioned configuration, the rotation of the main spindle 2 is increased in three steps according to the gear ratio of the planetary gear mechanism 31, the gear ratio between the low-speed gear 33a and the first intermediate gear 34a, and the gear ratio between the second intermediate gear 34b and the high-speed gear 35a, and the rotation torque is output from the output end section 35c of the output shaft 35. In other words, the rotation of the main spindle 2 by wind power is increased in three steps by the speed increaser 3 and is used to drive the generator 4.

The wind power generation device 1 is further equipped with an input rotor 5 provided on the output shaft 35 of the speed increaser 3 so as to be rotatable integrally therewith, an output rotor 6 provided on the drive shaft 41 of the generator 4 so as to be rotatable integrally therewith, a one-way clutch 7 disposed between the input rotor 5 and the output rotor 6, and a rotation transmission device 11 having a pair of rolling bearings 8 disposed on both sides of the one-way clutch 7 in the axial direction. The one-way clutch 7 is designed to transmit the rotation of the output shaft 35 to the drive shaft 41 via the input rotor 5 and the output rotor 6. In the wind power generation device 1 according to this embodiment, the rolling bearings 8 are disposed on both sides of the one-way clutch 7 in the axial direction; however, it is possible to use a one-way clutch having the rolling bearing 8 disposed only on one side of the one-way clutch 7 in the axial direction.

Figure 2:
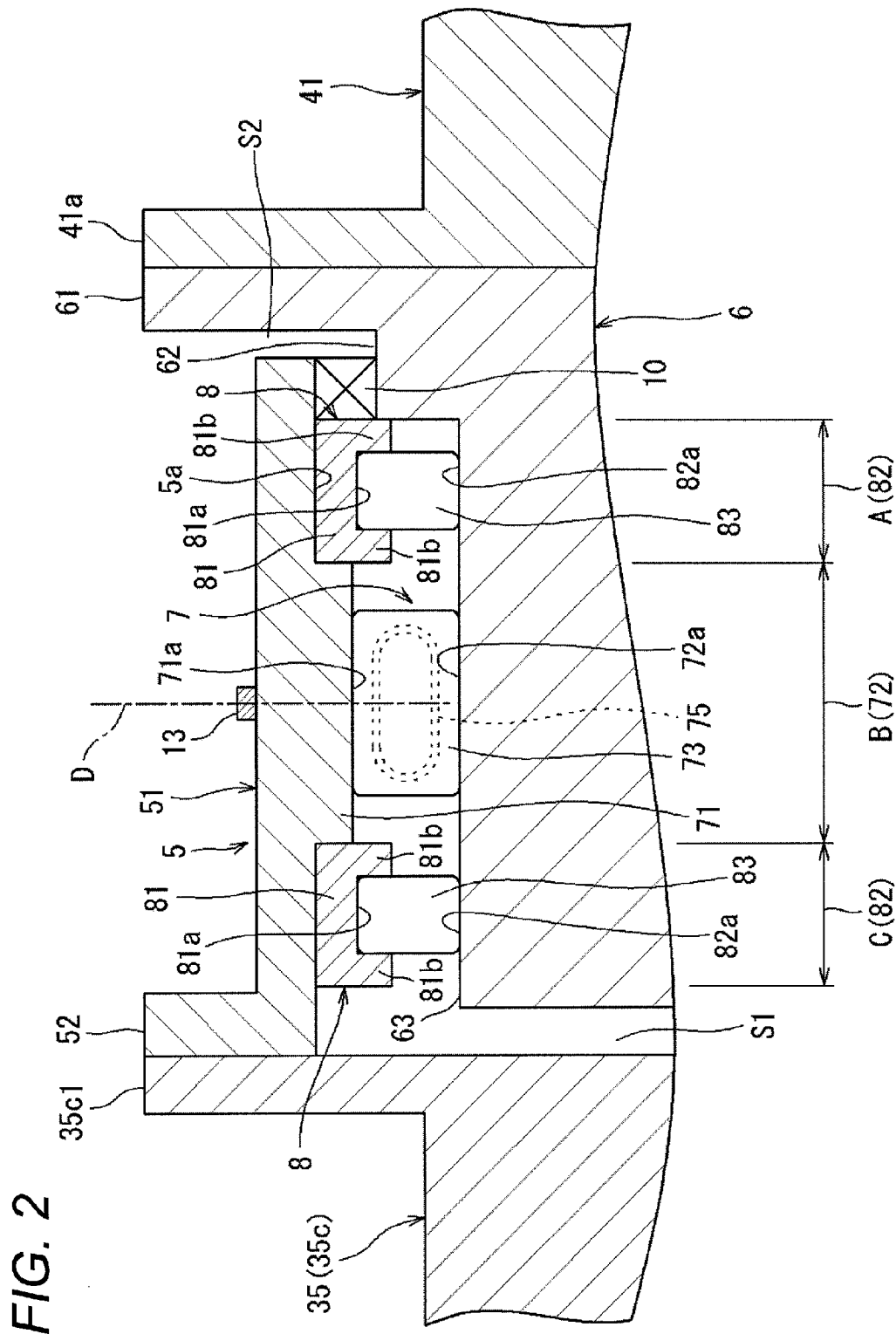
FIG. 2 is a cross-sectional view showing the connection portion between the output shaft of a speed increaser and the input shaft of a generator in the wind power generation device.

FIG. 2 is a cross-sectional view showing the connection portion between the output shaft 35 of the speed increaser 3 and the drive shaft 41 of the generator 4. In FIG. 2, the input rotor 5 is disposed coaxially with the output shaft 35 and has a cylindrical section 51 and a flange section 52 formed at the other end section (the left end section in FIG. 2) of the cylindrical section 51 in the axial direction.

The flange section 52 is formed so as to extend outward in the radial direction from the outer peripheral face of the cylindrical section 51 and is detachably fixed to the output end section 35c of the output shaft 35. More specifically, while making contact with the flange section 35c1 formed at the output end section 35c of the output shaft 35, the flange section 52 is secured and fixed to the flange section 35c1 using bolts and nuts, not shown. The inner peripheral face of the cylindrical section 51 is a cylindrical face.

The output rotor 6 is disposed on the inside of the input rotor 5 in the radial direction so as to be coaxial therewith and has a flange section 61, a large-diameter section 62 and a small-diameter section 63 in this order in the direction from one end section (the right end section in FIG. 2) of the output rotor to the other end section (the left end section in FIG. 2) thereof in the axial direction.

The flange section 61 is formed so as to extend outward in the radial direction from the outer peripheral face of the large-diameter section 62 and is detachably fixed to the drive shaft 41. More specifically, while making contact with the flange section 41a formed on the drive shaft 41, the flange section 61 is secured and fixed to the flange section 41a using bolts and nuts, not shown. A clearance S1 is formed between the end face of the small-diameter section 63 and the end face of the flange section 35c1 of the output shaft 35.

A ring-shaped sealing member 10 for hermetically sealing the ring-shaped space between the cylindrical section 51 and the large-diameter section 62 is provided in the clearance between the inner peripheral face of one end section (the right end section in FIG. 2) of the cylindrical section 51 of the input rotor 5 in the axial direction and the outer peripheral face of the large-diameter section 62 of the output rotor 6. A clearance S2 is formed between the end face on the one end section side of the cylindrical section 51 of the input rotor 5 and the end face of the flange section 61 of the output rotor 6 being opposed to the end face on the one end section side. By virtue of this clearance S2 and the above-mentioned clearance S1, the output rotor 6 is movable with respect to the input rotor 5 in the axial direction in a state in which the output rotor 6 is disconnected from the drive shaft 41.

Figure 3:
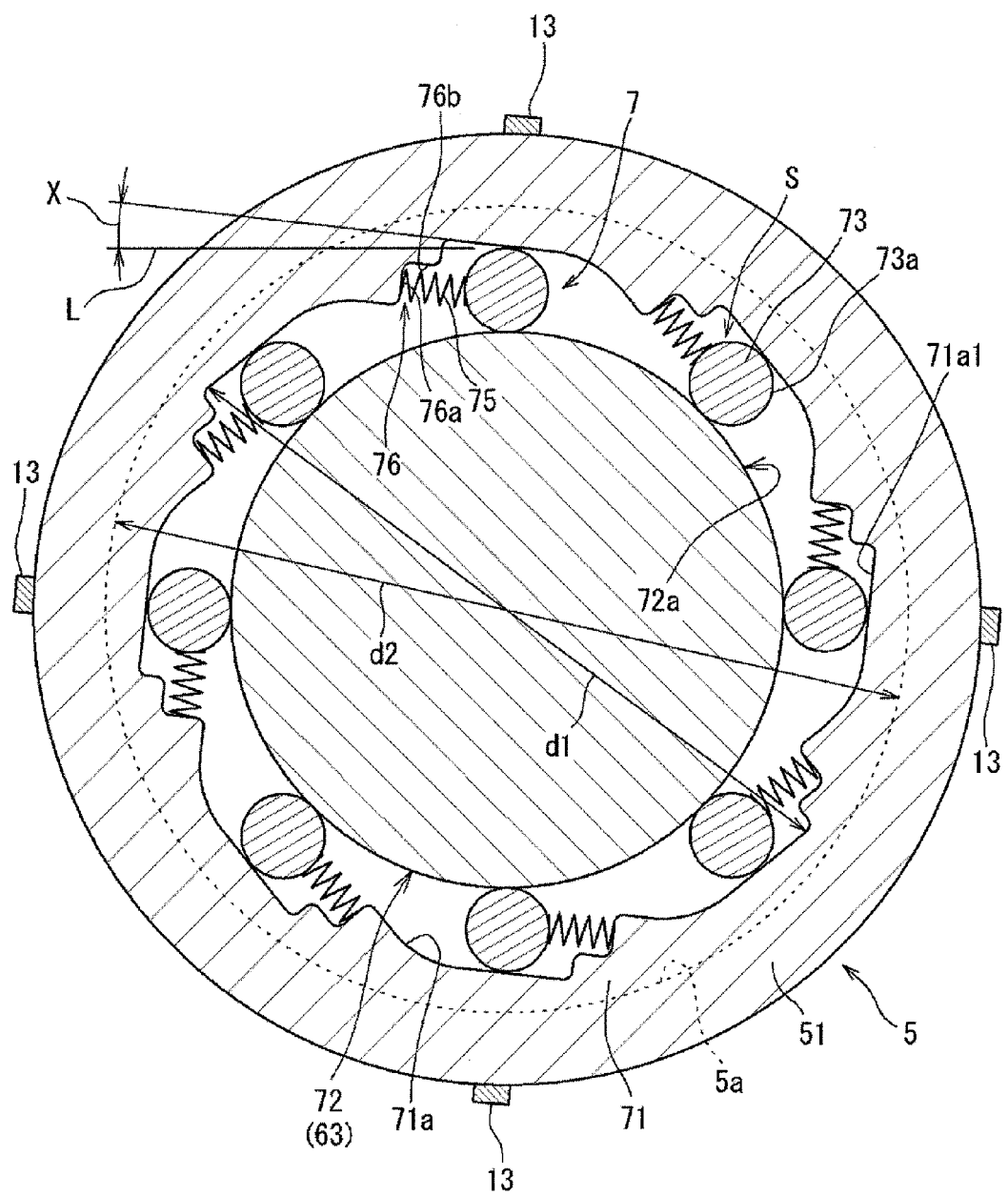
FIG. 3 is a cross-sectional view showing a one-way clutch in the wind power generation device.

FIG. 3 is a cross-sectional view showing the one-way clutch 7. As shown in FIGS. 2 and 3, the one-way clutch 7 is equipped with an outer ring 71, an inner ring 72, a plurality of rollers (engaging elements) 73 disposed between the inner peripheral face 71a of the outer ring 71 and the outer peripheral face 72a of the inner ring 72, and a plurality of elastic members 75 for elastically energizing the rollers 73 in one direction.

The outer ring 71 is composed of part of the cylindrical section 51 of the input rotor 5, more specifically, the region of the central section of the cylindrical section 51 in the axial direction. Furthermore, an outer ring cam face 71a1 is formed on the inner peripheral face 71a of the outer ring 71. The inner ring 72 is composed of part of the small-diameter section 63 of the output rotor 6, more specifically, the region B of the central section of the small-diameter section 63 in the axial direction. The rollers 73, being cylindrical in shape and eight in number, are disposed in the circumferential direction in this embodiment. The elastic member 75 is formed of a compression coil spring and is housed in a housing recess 76 formed in the inner peripheral face 71a of the outer ring 71.

In FIG. 3, outer ring cam faces 71a1, being nearly flat and as many (eight) as the rollers 73, are formed on the inner peripheral face 71a of the outer ring 71. Each outer ring cam face 71a1 is inclined by a predetermined angle X (for example, 7 to 10 degrees) outward in the radial direction with respect to the direction of the tangent L of the inner peripheral face of the outer ring 71. Furthermore, a plurality (eight) of wedge-shaped spaces S are formed in the circumferential direction between the outer ring cam face 71a1 and the outer peripheral face 72a of the inner ring 72. The maximum inside diameter d1 (the inside diameter across the points farthest outward in the radial direction with respect to the tangent L) of the outer ring cam face 71a1 is set to not more than the inside diameter d2 of the inner peripheral face 5a (the face on which the outer ring 81 of the rolling bearing 8 to be described later is press-fitted) of the input rotor 5.

Each roller 73 is disposed in each wedge-shaped space S, and the elastic member 75 energizes the roller 73 in the direction of making the wedge-shaped space S narrower. The outer peripheral face of the roller 73 serves as a contact face 73a making contact with the outer ring cam face 71a1 and the outer peripheral face 72a of the inner ring, and the contact face 73a is formed straight in the width direction (the axial direction). The one-way clutch 7 is used in an environment in which grease, serving as a lubricant containing an ester as the base oil and a urea-based compound as a thickener and hardly affected by temperature change, is supplied between the inner ring 72 and the outer ring 71.

The housing recess 76 formed in the inner peripheral face 71a of the outer ring 71 is formed so as to be continuous from one end section of the outer ring cam face 71a1 in the circumferential direction. The housing recess 76 has a contact face 76a wherein, in a state in which one end section of the elastic member 75 is made contact with the roller 73, the other end section of the elastic member 75 makes contact with the contact face 76a, and also has a restricting face 76b for restricting the elastic member 75 making contact with the contact face 76a from being moved outward in the radial direction by a centrifugal force. Furthermore, the elastic member 75 is held between the contact face 76a and the roller 73 in a state in which both the end sections thereof make contact with them. Hence, the one-way clutch 7 according to this embodiment is not equipped with a cage (for example, refer to a second embodiment) for holding the plurality of rollers 73 at intervals in the circumferential direction and for mounting the elastic members 75.

In the one-way clutch 7 configured as described above, in the case that the rotation speed of the input rotor 5 becomes higher than the rotation speed of the output rotor 6 when the rotation of the input rotor 5 is increased, the outer ring 71 tends to rotate relatively with respect to the inner ring 72 in one direction (the counterclockwise direction in FIG. 3). In this case, the roller 73 is moved slightly in the direction of making the wedge-shaped space S narrower by the energizing force of the elastic member 75, and the outer peripheral face (the contact face) 73a of the roller 73 makes pressure contact with the outer ring cam face 71a1 and the outer peripheral face 72a of the inner ring, whereby the one-way clutch 7 is maintained in a state in which the roller 73 is engaged between the inner ring 72 and the outer ring 71. As a result, the inner ring 72 and the outer ring 71 can rotate integrally in the one direction, whereby the input rotor 5 and the output rotor 6 can be connected to each other so as to be rotatable integrally.

Furthermore, after the rotation of the input rotor 5 is increased and when the rotation speed of the input rotor 5 becomes constant and equal to the rotation speed of the output rotor 6, the rollers 73 are held in a state of being engaged between the inner ring 72 and the outer ring 71. Hence, the one-way clutch 7 is maintained in a state in which the inner ring 72 and the outer ring 71 rotate integrally in the one direction, and the input rotor 5 and the output rotor 6 continue to rotate integrally.

On the other hand, in the case that the rotation speed of the input rotor 5 becomes lower than the rotation speed of the output rotor 6 when the rotation of the input rotor 5 is decreased, the outer ring 71 tends to rotate relatively with respect to the inner ring 72 in the other direction (the clockwise direction in FIG. 3). In this case, the roller 73 is moved slightly in the direction of making the wedge-shaped space S wider against the energizing force of the elastic member 75, whereby the engagement between the roller 73 and the inner and outer rings 72 and 71 is released. Since the engagement of the roller 73 is released in this way, the connection between the input rotor 5 and the output rotor 6 is cut off.

In FIG. 2, the rolling bearings 8, used as a pair, are respectively disposed between the cylindrical section 51 of the input rotor 5 and the small-diameter section 63 of the output rotor 6, thereby supporting the input rotor 5 and the output rotor 6 so that the rotors are relatively rotatable to each other. The rolling bearing 8 is a cylindrical roller bearing equipped with an outer ring 81, an inner ring 82 and a plurality of cylindrical rollers 83 rotatably disposed between the outer ring 81 and the inner ring 82.

The outer ring 81 has an outer ring raceway face 81a formed on the inner periphery thereof and outer ring rib sections 81b formed so as to protrude inward in the radial direction on both sides of the outer ring raceway face 81a in the axial direction. The outer peripheral face of the outer ring 81 is fitted on the inner peripheral face 5a of the input rotor 5. Both the end faces of the cylindrical roller 83 respectively make slide contact with the inside faces of the outer ring rib sections 81b.

The region A and the region C of both the end sections of the small-diameter section 63 of the output rotor 6 in the axial direction are used as the inner rings 82 of the rolling bearings 8, and the outer peripheral faces of the regions A and C are configured as the inner ring raceway faces 82a of the inner rings 82. The cylindrical rollers 83 are rotatably disposed between the inner ring raceway face 82a and the outer ring raceway face 81a.

In the wind power generation device 1 according to this embodiment, when the rotation speed of the input rotor 5 becomes lower than the rotation speed of the output rotor 6, the connection between the input rotor 5 and the output rotor 6 can be cut off by the one-way clutch 7 disposed between the input rotor 5 that rotates integrally with the output shaft 35 of the speed increaser 3 and the output rotor 6 that rotates integrally with the drive shaft 41 of the generator 4. In other words, even if the rotation speed of the output shaft 35 is lowered abruptly via the main spindle 2 due to the lowering of wind power, the inertia rotation of the rotor 42 of the generator 4 can be prevented from being transmitted to the output shaft 35 via the drive shaft 41. As a result, the decrease in the radial load exerted to the rolling bearing 38 for supporting the output shaft 35 and the delay in the self-rotation of the cylindrical rollers of the rolling bearing 38 accompanied by the decrease can be suppressed. Hence, when the rotation speed of the main spindle 2 is increased abruptly due to the change in wind power and a high load is exerted to the cylindrical rollers of the roller bearing 38 from the above-mentioned state, the slipping of the cylindrical rollers of the roller bearing 38 on the contact faces thereof making contact with the inner ring becomes difficult, whereby the occurrence of smearing on the roller bearing 38 can be suppressed effectively.

Moreover, since the inertia rotation of the rotor 42 is prevented from being transmitted to the output shaft 35, the loads exerted to the roller bearings 36a, 36b, 37a, 37b, 38 and 39 can be decreased. Hence, all of the gears 31b and 31c of the planetary gear mechanism 31, the shafts 33 to 35 of the high speed stage gear mechanism 32 and the roller bearings 36a, 36b, 37a, 37b, 38 and 39 can be made compact, whereby the speed increaser 3 can be made light in weight and can be produced at low cost.

What's more, since the connection between the input rotor 5 and the output rotor 6 is cut off, the rotation speed of the rotor 42 of the generator 4 is not lowered abruptly and the rotor is rotated continuously by inertia, whereby the average rotation speed of the rotor 42 can be raised. As a result, the power generation efficiency of the generator 4 can be improved.

Still further, between the input rotor 5 and the output rotor 6, the rolling bearings 8 for supporting them so as to be relatively rotatable to each other are disposed; hence, when clearances are generated between the roller 73 and the inner and outer rings 72 and 71 in the wedge-shaped space S by releasing the engagements between the roller 73 and the inner and outer rings 72 and 71 in the one-way clutch 7, the input rotor 5 and the output rotor 6 can be prevented from moving in the radial direction relative to each other by the rolling bearings 8. As a result, during the operation of the wind power generation device 1, the input rotor 5 and the output rotor 6 can be prevented from rattling in the radial direction.

Figure 4:
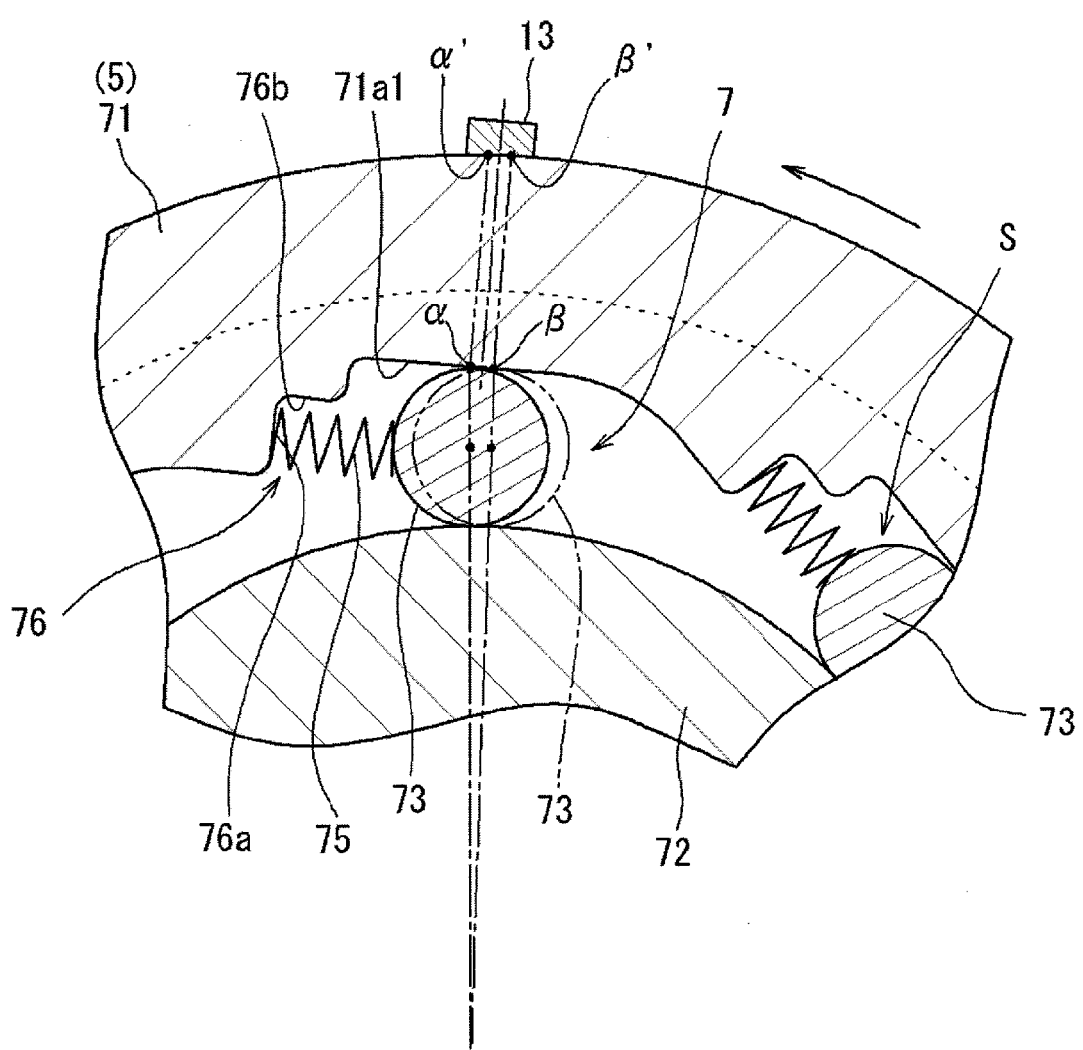
FIG. 4 is an enlarged cross-sectional view showing part of the one-way clutch in the wind power generation device 1.

FIG. 4 is an enlarged cross-sectional view showing part of the one-way clutch 7 in the wind power generation device 1.

As shown in FIGS. 3 and 4, strain sensors (measurement sections) 13 for detecting the strain generated in the outer ring 71 are provided on the one-way clutch 7 constituting the rotation transmission device 11. These strain sensors 13 are provided at four places at equal intervals on the outer peripheral face of the outer ring 71. Furthermore, in the outer peripheral face of the outer ring 71 at the outside in the radial direction of the outer ring cam face 71a, the strain sensors 13 are provided in regions to which forces are directly exerted by the engagement with the rollers 73.

More specifically, when the contact point between the roller 73 (indicated by a solid line in FIG. 4) and the cam face 71a1 in a state in which the outer ring cam face 71a1 is not engaged with the outer peripheral face 72a of the inner ring, for example, in a state in which the outer ring 71 and the inner ring 72 are stopped and no power is transmitted, is assumed to be α, and when the contact point between the roller 73 (indicated by a two-dot chain line in FIG. 4) and the cam face 71a1 in a state in which the roller 73 is engaged with the outer ring cam face 71a1 and outer peripheral face 72a of the inner ring to the utmost degree by the exertion of a torque load to the one-way clutch 7 is assumed to be β, the strain sensor 13 is provided so that the imaginary lines extending from the contact points α and β in the normal direction of the cam face 71a1 include the region between the points α' and β' intersecting the outer peripheral face of the outer ring 71. Moreover, as shown in FIG. 2, the strain sensor 13 is provided so as to be aligned with the center D of the roller 73 in the axial direction.

What's more, when the roller 73 is engaged with the outer ring cam face 71a1, a strain is generated in the outer ring 71 on the outside thereof in the radial direction, and the strain sensor 13 measures this strain.

The measurement value of each strain sensor 13 is transmitted to the control unit 9 by a wireless transmitter, not shown. As shown in FIG. 1, the control unit 9 is equipped with an acquisition section 15 for acquiring the torque load of the one-way clutch 7, an electric load adjustment section 16 for adjusting the electric load (power generation amount) in the generator 4 and a storage section 17 for storing a table representing the relationship between the strain generated in the outer ring 71 and the torque load exerted to the outer ring 71.

The acquisition section 15 reads the strains measured by the respective strain sensors 13, obtains the average value or the median of the strains and refers to the table stored in the storage section 17, thereby obtaining the torque load corresponding to the strain value.

In addition, the electric load adjustment section 16 adjusts the electric load in the generator 4 depending on the torque load acquired by the acquisition section 15. For example, in the case that the torque load acquired by the acquisition section 15 is large, the electric load adjustment section 16 adjusts the electric load so as to lower the output (power generation amount) of the generator 4. As a result, the torque load exerted to the one-way clutch 7 is lowered and the burden exerted to the one-way clutch 7 is reduced, whereby problems such as damage can be prevented from occurring.

Furthermore, since the torque load exerted to the speed increaser 3 can also be lowered similarly, problems can be prevented from occurring in the speed increaser 3. As the method of adjusting the electric load of the generator 4, various kinds of conventionally known methods can be adopted (for example, refer to JP-A-2008-278725).

The control unit 9 also has a transmission section 18 for transmitting information indicating the measurement values of the strains generated in the outer ring 71 and the acquired torque loads to an operation monitoring device (operation monitoring facility) 20. This operation monitoring device 20 monitors the operation state of the wind power generation device 1, the presence/absence of problem occurrence, etc. at all times by using, for example, information indicating the measurement values of the strains and the torque loads transmitted from the control unit 9. Furthermore, the operation monitoring device 20 can collectively monitor the operation states and the like of a plurality of wind power generation devices 1.

Second Embodiment

Figure 5:
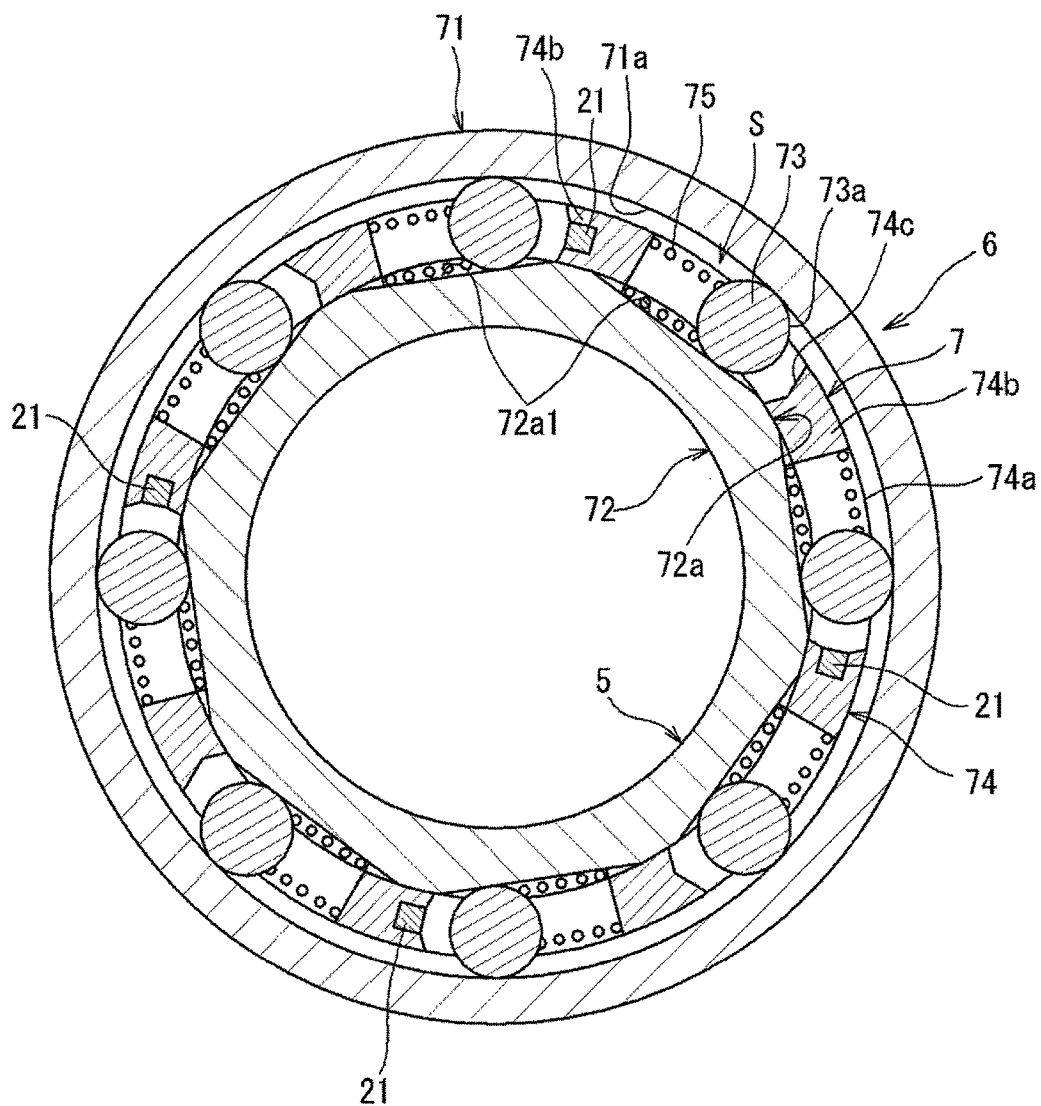
FIG. 5 is a cross-sectional view showing a one-way clutch according to a second embodiment of the present invention.
Figure 6:
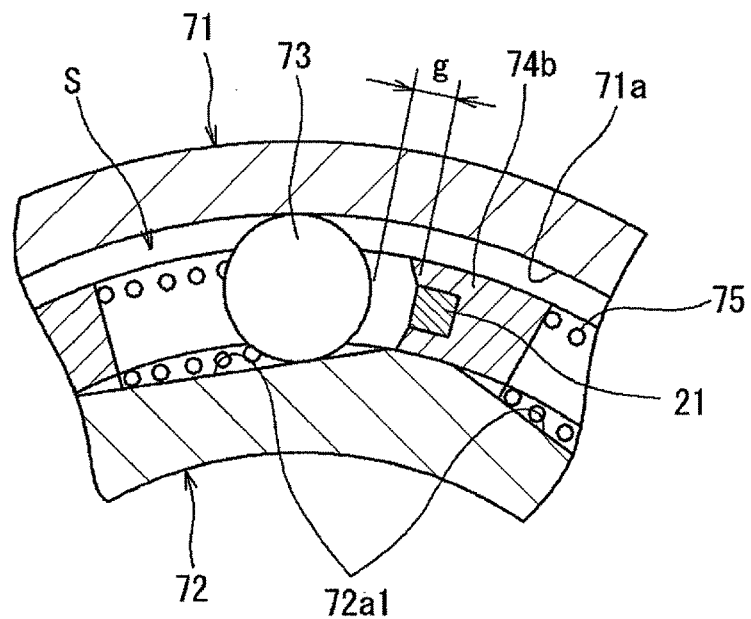
FIG. 6 is an enlarged cross-sectional view showing part of the one-way clutch.

FIG. 5 is a cross-sectional view showing a one-way clutch 7 according to a second embodiment of the present invention, and FIG. 6 is an enlarged cross-sectional view showing part of the one-way clutch 7.

In the one-way clutch 7 according to this embodiment, nearly flat cam faces 72a1 are formed on the outer peripheral face 72a of the inner ring 72, the inner peripheral face 71a of the outer ring 71 is formed into a cylindrical face, and wedge-shaped spaces S are formed between the faces 72a1 and 71a. Rollers 73 serving as engagement elements are disposed in the respective wedge-shaped spaces S. A ring-shaped cage 74 for holding the rollers 73 at predetermined intervals in the circumferential direction is provided between the inner ring 72 and the outer ring 71.

The cage 74 has a pair of ring sections 74a opposed to each other in the axial direction and a plurality of column sections 74b extending in the axial direction between both the ring-shaped sections 74a and arranged at equal intervals in the circumferential direction so as to connect both the ring-shaped section 74a. Each of a plurality of pockets 74c is formed between both the ring-shaped sections 74a and between the column sections 74b adjacent to each other, whereby each roller 73 is accommodated in each pocket 74c. Furthermore, an elastic member 75 for elastically energizing the roller 73 in one direction is provided in the pocket 74c.

Moreover, in this embodiment, the inner ring 72 is provided on the side of the input rotor 5, and the outer ring 71 is provided on the side of the output rotor 6.

In the one-way clutch 7 according to this embodiment, in the case that the rotation speed of the input rotor 5 becomes higher than the rotation speed of the output rotor 6 when the rotation of the input rotor 5 is increased, the inner ring 72 tends to rotate relatively with respect to the outer ring 71 in one direction (the counterclockwise direction in FIG. 5); however, the roller 73 is moved slightly in the direction of making the wedge-shaped space S narrower by the energizing force of the elastic member 75, and the contact face 73a of the roller 73 makes pressure contact with the cam face 72a1 of the inner ring 72 and the inner peripheral face 71a of the outer ring 71, whereby the one-way clutch 7 is maintained in a state in which the roller 73 is engaged between the inner ring 72 and the outer ring 71. As a result, the inner ring 72 and the outer ring 71 can rotate integrally in the one direction, whereby the input rotor 5 and the output rotor 6 can be connected to each other so as to be rotatable integrally.

Furthermore, after the rotation of the input rotor 5 is increased and when the rotation speed of the input rotor 5 becomes constant and equal to the rotation speed of the output rotor 6, the rollers 73 are held in a state of being engaged between the inner ring 72 and the outer ring 71. Hence, the one-way clutch 7 is maintained in a state in which the inner ring 72 and the outer ring 71 rotate integrally in the one direction, and the input rotor 5 and the output rotor 6 continue to rotate integrally.

On the other hand, in the case that the rotation speed of the input rotor 5 becomes lower than the rotation speed of the output rotor 6 when the rotation of the input rotor 5 is decreased, the inner ring 72 tends to rotate relatively with respect to the outer ring 71 in the other direction (the clockwise direction in FIG. 4). In this case, the roller 73 is moved slightly in the direction of making the wedge-shaped space S wider against the energizing force of the elastic member 75, whereby the engagement between the roller 73 and the inner and outer rings 72 and 71 is released. Since the engagement of the roller 73 is released in this way, the connection between the input rotor 5 and the output rotor 6 is cut off.

As shown in FIG. 6, a gap sensor 21 is provided on the column section 74b of the cage 74. This gap sensor 21 is mounted on the side face of the column section 74b opposed to the roller 73. The gap sensor 21 detects the gap (clearance) g between the roller 73 and the gap sensor. In this embodiment, as shown in FIG. 5, four gap sensors 21 are provided in the circumferential direction at equal intervals. In other words, the gap sensors 21 are provided for the four rollers 73 of the eight rollers 73, that is, for every other roller.

In the case that the rotation speed of the input rotor 5 becomes higher than the rotation speed of the output rotor 6, the roller 73 is moved in the direction of making the wedge-shaped space S narrower, and the gap g between the roller 73 and the gap sensor 21 becomes small. Conversely, in the case that the rotation speed of the input rotor 5 becomes lower than the rotation speed of the output rotor 6, the roller 73 is moved in the direction of making the wedge-shaped space S wider, and the gap g between the roller 73 and the gap sensor 21 becomes large.

Hence, the degree of the engagement of the roller 73 with the inner and outer rings 72 and 71, that is, the torque load exerted to the one-way clutch 7, can be grasped by measuring the gap g between the roller 73 and the gap sensor 21. More specifically, a table representing the relationship between the measurement value of the gap sensor 21 and the torque load is stored in the storage section 17 of the control unit 9, and the acquisition section 15 is configured so as to obtain the torque load by reading the measurement value of the gap sensor 21 and by considering the table.

Hence, this embodiment exhibits operational advantages similar to those of the first embodiment.

Third Embodiment

Figure 7:
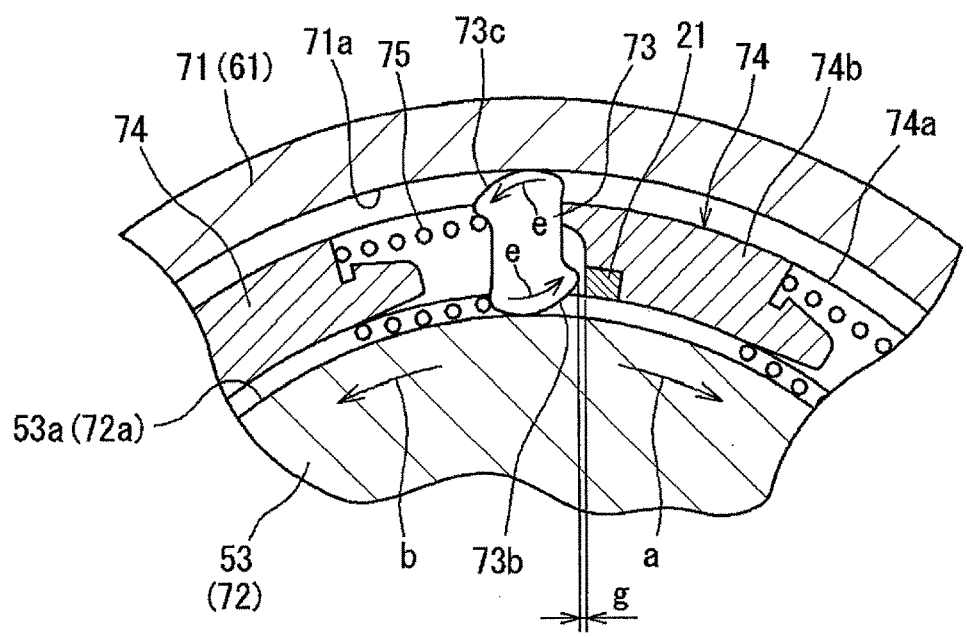
FIG. 7 is an enlarged cross-sectional view showing part of a one-way clutch according to a third embodiment of the present invention.

FIG. 7 is an enlarged cross-sectional view showing part of a one-way clutch 7 according to a third embodiment of the present invention.

The one-way clutch 7 according to this embodiment is similar to that according to the second embodiment in that the gap sensors 21 are provided on the cage 74, but different in that sprags are used as engagement elements 73. Furthermore, the inner ring 72 of the one-way clutch 7 is composed of the shaft section 53 of an input rotor 5 and the outer peripheral face 72a of the inner ring 72 is composed of the outer peripheral face 53a of the shaft section 53. Hence, such cam faces as those according to the second embodiment are not formed on the outer peripheral face 72a of the inner ring 72, whereby the outer peripheral face 72a is formed into a cylindrical face.

A sprag 73 has a first contact face 73b making contact with the outer peripheral face 72a of the inner ring 72 and a second contact face 73c making contact with the inner peripheral face 71a of the outer ring 71, and the first contact face 73b and the second contact face 73c are formed into a convex shape and a nearly arcuate shape, respectively. Furthermore, the distance between the first contact face 73b and the second contact face 73c respectively making contact with the outer peripheral face 72a of the inner ring 72 and the inner peripheral face 71a of the outer ring 71 is changed by the inclination of the sprag 73; when the inner ring 72 rotates in the direction indicated by arrow a, the sprag 73 is inclined in the direction indicated by arrow e and the distance between the first contact face 73b and the second contact face 73c becomes large. Conversely, when the inner ring 72 rotates in the direction indicated by arrow b, the sprag 73 is inclined in the direction opposite to the direction indicated by arrow e and the distance between the first contact face 73b and the second contact face 73c becomes small.

Furthermore, in the case that the distance between the first contact face 73b and the second contact face 73c becomes large, the sprag 73 is engaged with the outer peripheral face 72a of the inner ring 72 and the inner peripheral face 71a of the outer ring 71; conversely, in the case that the distance between the first contact face 73b and the second contact face 73c becomes small, the engagement of the sprag 73 with the outer peripheral face 72a of the inner ring 72 and the inner peripheral face 71a of the outer ring 71 is released. Hence, when the inner ring 72 tends to relatively rotate in the direction indicated by the arrow a with respect to the outer ring 71, the inner ring 72 is connected to the outer ring 71 so as to be rotatable integrally; and when the inner ring 72 relatively rotates in the direction indicated by the arrow b with respect to the outer ring 71, the connection between the inner ring 72 and the outer ring 71 is cut off.

Furthermore, the gap sensor 21 provided on the column section 74b of the cage 74 measures the gap g between the gap sensor and the sprag 73. Then, the degree of the engagement of the sprag 73 with the inner and outer rings 72 and 71, that is, the torque load exerted to the one-way clutch 7, can be grasped by measuring the gap g between the sprag 73 and the gap sensor 21. More specifically, a table representing the relationship between the measurement value of the gap sensor 21 and the torque load is stored in the storage section 17 of the control unit 9, and the acquisition section 15 is configured so as to obtain the torque load by reading the measurement value of the gap sensor 21 and by considering the table.

Hence, this embodiment also exhibits operational advantages similar to those of the first embodiment.

Furthermore, in this embodiment, it is not necessary to form cam faces on the inner ring 72 (shaft section 53) of the one-way clutch 7, the production cost thereof can be reduced. Moreover, since the shaft section 53 can be used as the inner ring 72, the production cost can be further reduced, and the one-way clutch 7 can be simplified in structure and made compact in the radial direction. What's more, since the rigidity and torque capacity of the sprag 73 can be raised more easily than those of the roller, the dimensions of the sprag 73 in the radial direction and the axial direction can be made small. As a result, the dimensions of the one-way clutch 7 in the radial direction and the axial direction can be made small, whereby the one-way clutch 7 can be made compact. The rotation transmission device 11 can thus be made compact as a whole in the radial direction and the axial direction by making the one-way clutch 7 compact as described above. Consequently, even in the case that the space between the output shaft 35 of the speed increaser 3 and the drive shaft 41 of the generator 4 is small, the rotation transmission device 11 can be disposed suitably.

Furthermore, the present invention can be modified and embodied appropriately without being limited by the above-mentioned embodiments. For example, as the measurement sections for measuring the state of the one-way clutch 7, a temperature sensor for measuring the temperature of the one-way clutch 7 and a vibration sensor for measuring the vibration of the one-way clutch 7, for example, can be used. Since the thermal energy generated in the one-way clutch 7 becomes large when the load, such as the torque load, exerted to the one-way clutch 7 becomes large, the load exerted to the one-way clutch 7 can be grasped by measuring the temperature of the one-way clutch 7. Similarly, since vibration becomes large when the load exerted to the one-way clutch 7 becomes large, the load exerted to the one-way clutch 7 can be grasped by measuring the vibration generated in the one-way clutch 7.

Although the gap sensor 21 is used as the sensor constituting the measurement section in the above-mentioned second embodiment, the strain sensor 13 for measuring the strain of the inner ring 72 may also be used. In this case, the strain sensor 13 may merely be provided at a position corresponding to the inside of the cam face 72a1 in the radial direction.

Moreover, although the strain sensor 13 is used as the sensor constituting the measurement section in the first embodiment, the gap sensor 21 described in the second and third embodiments may also be used.

Although the information obtained by the measurement using the measurement sections 13 and 21 is transmitted wirelessly in the above-mentioned embodiments, the information may be recorded by a recording device, such as a data logger, and may be fetched from the recording device periodically.

Fourth Embodiment

Figure 8:
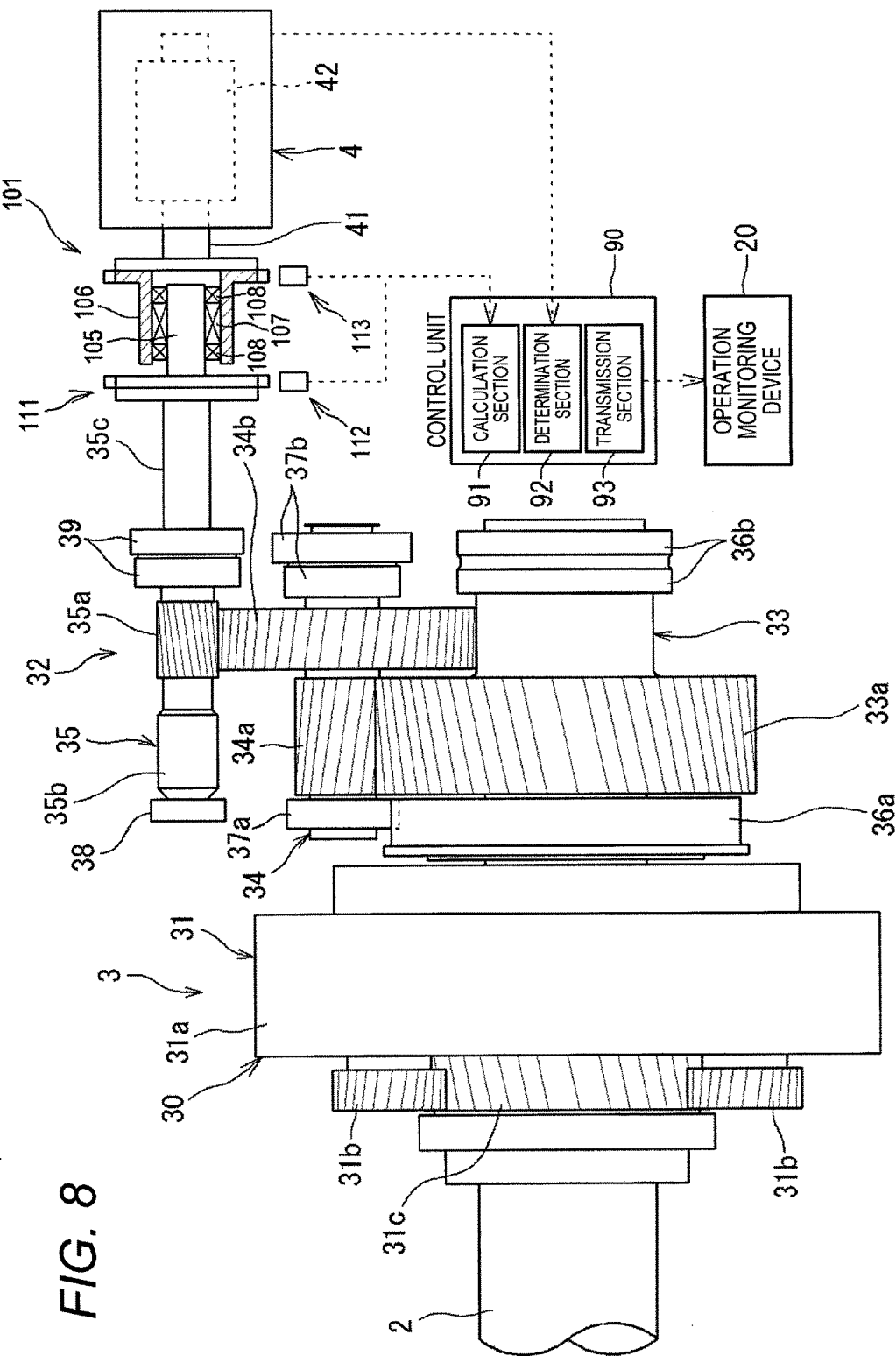
FIG. 8 is a schematic side view showing a wind power generation device according to a fourth embodiment of the present invention.

FIG. 8 is a schematic side view showing a wind power generation device according to a fourth embodiment of the present invention. In this embodiment, components identical or similar to those according to the first to third embodiments are designated by the same numerals and their overlapping descriptions are omitted.

The wind power generation device 101 is further equipped with an input rotor 105 provided on the output shaft 35 of the speed increaser 3 so as to be integrally rotatable therewith, an output rotor 106 provided on the drive shaft 41 of the generator 4 so as to be integrally rotatable therewith, a one-way clutch 107 disposed between the input rotor 105 and the output rotor 106, and a rotation transmission device 111 having a pair of rolling bearings 108 disposed on both sides of the one-way clutch 107 in the axial direction. The one-way clutch 107 is designed to transmit the rotation of the output shaft 35 to the drive shaft 41 via the input rotor 105 and the output rotor 106. In this embodiment, the rolling bearings 108 are disposed on both sides of the one-way clutch 107 in the axial direction; however, it is possible to use a one-way clutch having the rolling bearing 108 disposed only on one side of the one-way clutch 107 in the axial direction.

Figure 9:
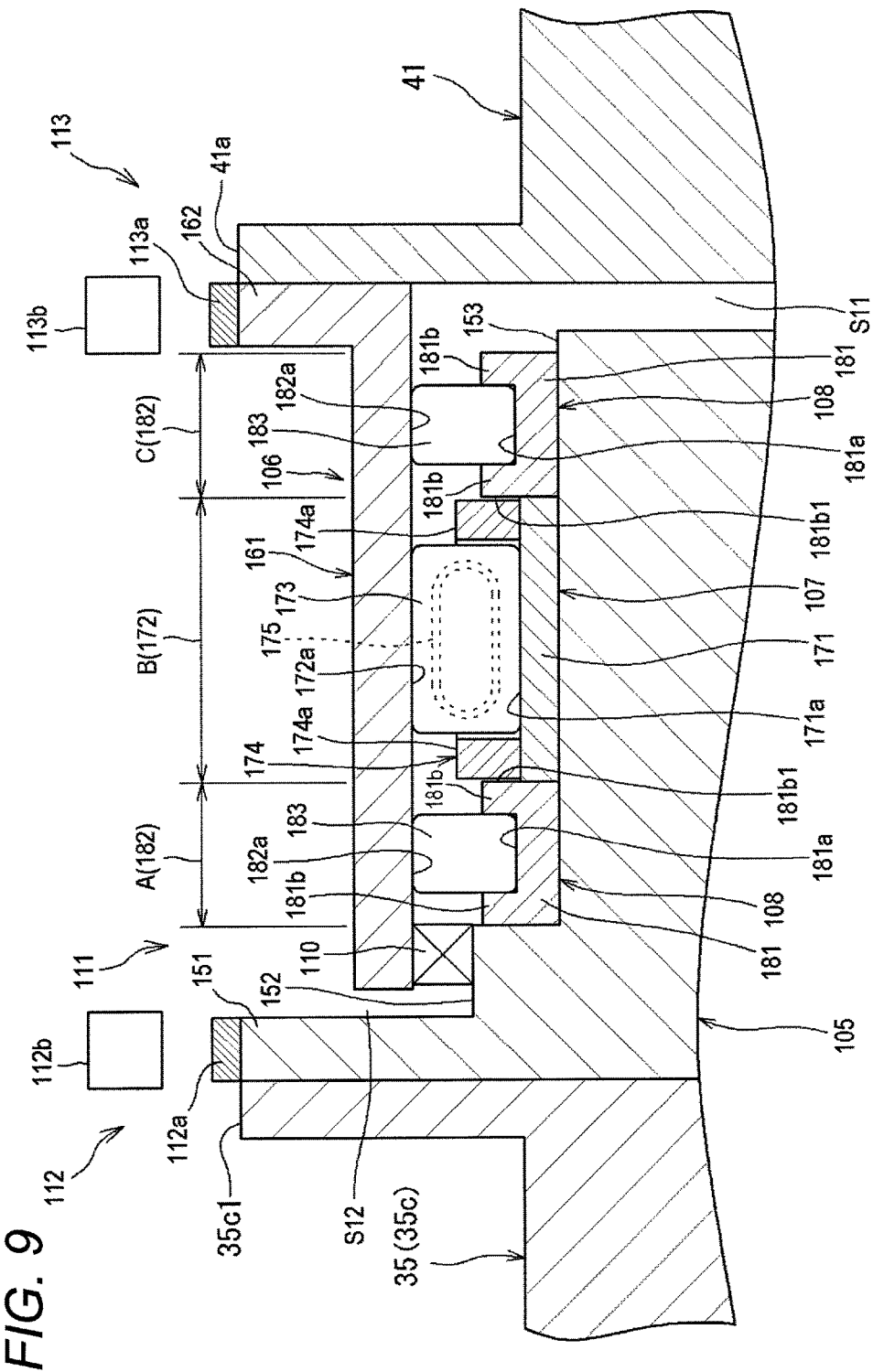
FIG. 9 is a cross-sectional view showing the connection portion between the output shaft of a speed increaser and the input shaft of a generator in the wind power generation device.

FIG. 9 is a cross-sectional view showing the connection portion between the output shaft 35 of the speed increaser 3 and the drive shaft 41 of the generator 4. In FIG. 9, the input rotor 105 is disposed coaxially with the output shaft 35 and has a flange section 151, a large-diameter section 152 and a small-diameter section 153 in this order in the direction from one end section (the left end section in FIG. 9) of the input rotor to the other end section (the right end section in FIG. 9) thereof in the axial direction.

The flange section 151 is formed so as to extend outward in the radial direction from the outer peripheral face of the large-diameter section 152 and is detachably fixed to the output end section 35c of the output shaft 35. More specifically, while making contact with the flange section 35c1 formed on the output end section 35c, the flange section 151 is secured and fixed to the flange section 35c1 using bolts and nuts, not shown. A clearance S11 is formed between the end face of the small-diameter section 153 and the end face of the flange section 41a of the drive shaft 41.

The output rotor 106 is disposed on the outside of the input rotor 105 in the radial direction so as to be coaxial therewith and has a cylindrical section 161 and a flange section 162 formed on the other end section (the right end section in FIG. 9) of the cylindrical section 161 in the axial direction.

The flange section 162 is formed so as to extend outward in the radial direction from the outer peripheral face of the cylindrical section 161 and is detachably fixed to one end section of the drive shaft 41. More specifically, while making contact with the flange section 41a formed on the one end section of the drive shaft 41, the flange section 162 is secured and fixed to the flange section 41a using bolts and nuts, not shown.

The inner peripheral face of the cylindrical section 161 is formed into a cylindrical face, and a ring-shaped sealing member 110 for hermetically sealing the ring-shaped space between the cylindrical section 161 and the small-diameter section 153 of the input rotor 105 is provided in the clearance between the inner peripheral face of one end section (the left end section in FIG. 9) of the cylindrical section 161 in the axial direction and the outer peripheral face of the large-diameter section 152 of the input rotor 105. A clearance S12 is formed between the end face on the one end section side of the cylindrical section 161 and the end face of the flange section 151 of the input rotor 105 being opposed to the end face on the one end section side. By virtue of this configuration, the output rotor 106 is movable with respect to the input rotor 105 on both sides in the axial direction in a state in which the output rotor 106 is disconnected from the drive shaft 41.

Figure 10:
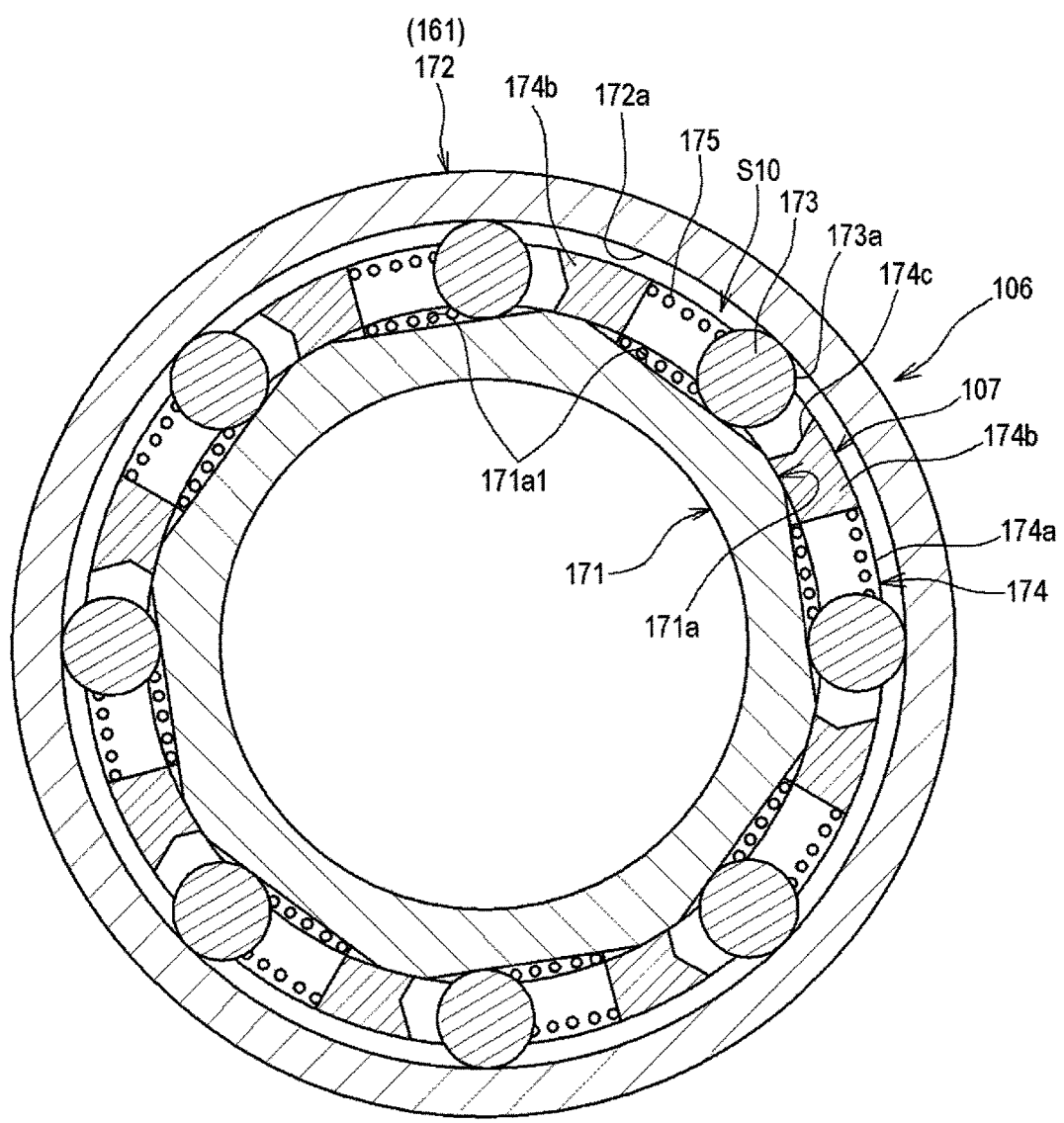
FIG. 10 is a cross-sectional view showing a one-way clutch in the wind power generation device.

FIG. 10 is a cross-sectional view showing the one-way clutch 107. As shown in FIGS. 9 and 10, the one-way clutch 107 is equipped with an inner ring 171, an outer ring 172 and a plurality of rollers 173 disposed between the outer peripheral face 171a of the inner ring 171 and the inner peripheral face 172a of the outer ring 172.

The inner ring 171 is fitted on the central section of the small-diameter section 153 of the input rotor 105 in the axial direction and fixed thereto so as to rotate integrally with the small-diameter section 153. The region B at the central section of the cylindrical section 161 of the output rotor 106 in the axial direction is used as the outer ring 172 of the one-way clutch 107. Hence, the inner peripheral face of the region B of the cylindrical section 161 is used as the inner peripheral face 172a of the outer ring 172. The rollers 173, being cylindrical in shape and eight in number, are disposed in the circumferential direction in this embodiment.

The one-way clutch 107 is further equipped with a ring-shaped cage 174 for holding the respective rollers 173 at predetermined intervals in the circumferential direction and a plurality of elastic members 175 for elastically energizing the rollers 173 in one direction.

The cage 174 has a pair of ring sections 174a opposed to each other in the axial direction and a plurality of column sections 174b extending in the axial direction between both the ring-shaped sections 174a and arranged at equal intervals in the circumferential direction so as to connect both the ring-shaped section 174a. Each of a plurality of pockets 174c is formed between both the ring-shaped sections 174a and between the column sections 174b adjacent to each other, whereby each roller 173 is accommodated in each pocket 174c.

The elastic member 175, formed of a compression coil spring, is accommodated in each pocket 174c of the cage 174 and attached to the column section 174b.

In FIG. 10, cam faces 171a1, being flat and as many (eight) as the rollers 173, are formed on the outer peripheral face 171a of the inner ring 171, and the inner peripheral face 172a of the outer ring 172 is a cylindrical face. A plurality (eight) of wedge-shaped spaces S10 are formed in the circumferential direction between the cam faces 171a1 of the inner ring 171 and the cylindrical face of the outer ring 172. Moreover, each roller 173 is disposed in each wedge-shaped space S10, and the elastic member 175 energizes the roller 173 in the direction of making the wedge-shaped space S10 narrower. The outer peripheral face of the roller 173 serves as a contact face 173a making contact with the cam face 171a1 of the inner ring 171 and the cylindrical face of the outer ring 172, and the contact face 173a is formed straight in the width direction (the axial direction). The one-way clutch 107 is used in an environment in which grease, serving as a lubricant containing an ester as the base oil and a urea-based compound as a thickener and hardly affected by temperature change, is supplied between the inner ring 171 and the outer ring 172.

In the one-way clutch 107 configured as described above, in the case that the rotation speed of the input rotor 105 becomes higher than the rotation speed of the output rotor 106 when the rotation of the input rotor 105 is increased, the inner ring 171 tends to rotate relatively with respect to the outer ring 172 in one direction (the counterclockwise direction in FIG. 10). In this case, the roller 173 is moved slightly in the direction of making the wedge-shaped space S10 narrower by the energizing force of the elastic member 175, and the contact face 173a of the roller 173 makes pressure contact with the outer peripheral face 171a of the inner ring 171 and the inner peripheral face 172a of the outer ring 172, whereby the one-way clutch 107 is maintained in a state in which the roller 173 is engaged between the inner ring 171 and the outer ring 172. As a result, the inner ring 171 and the outer ring 172 can rotate integrally in the one direction, whereby the input rotor 105 and the output rotor 106 can be connected to each other so as to be rotatable integrally.

Furthermore, after the rotation of the input rotor 105 is increased and when the rotation speed of the input rotor 105 becomes constant and equal to the rotation speed of the output rotor 106, the rollers 173 are held in a state of being engaged between the inner ring 171 and the outer ring 172. Hence, the one-way clutch 107 is maintained in a state in which the inner ring 171 and the outer ring 172 rotate integrally in the one direction, and the input rotor 105 and the output rotor 106 continue to rotate integrally.

On the other hand, in the case that the rotation speed of the input rotor 105 becomes lower than the rotation speed of the output rotor 106 when the rotation of the input rotor 105 is decreased, the inner ring 171 tends to rotate relatively with respect to the outer ring 172 in the other direction (the clockwise direction in FIG. 10). In this case, the roller 173 is moved slightly in the direction of making the wedge-shaped space S10 wider against the energizing force of the elastic member 175, whereby the engagement between the roller 173 and the inner and outer rings 171 and 172 is released. Since the engagement of the roller 173 is released in this way, the connection between the input rotor 105 and the output rotor 106 is cut off.

In FIG. 9, the rolling bearings 108, used as a pair, are respectively disposed between the small-diameter section 153 of the input rotor 105 and the cylindrical section 161 of the output rotor 106, thereby supporting the input rotor 105 and the output rotor 106 so that the rotors are relatively rotatable to each other. Furthermore, the rolling bearings 108 are disposed so as to be adjacent to both sides of the one-way clutch 107 in the axial direction so that the end sections of the rolling bearings 108 in the axial direction can make contact with both end faces of the cage 174 of the one-way clutch 107 in the axial direction.

The rolling bearing 108 is a cylindrical roller bearing equipped with an inner ring 181, an outer ring 182 and a plurality of cylindrical rollers 183 rotatably disposed between the inner ring 181 and the outer ring 182.

The inner ring 181 has an inner ring raceway face 181a formed on the outer periphery thereof and an inner ring rib sections 181b formed so as to protrude outward in the radial direction on both sides of the inner ring raceway face 181a in the axial direction. Both the end faces of the cylindrical roller 183 respectively make slide contact with the inside faces of the respective inner ring rib sections 181b. Moreover, the outside face 181b1 of the inner ring rib sections 181b adjacent to the one-way clutch 107 is used as a contact face making contact with the outside face of the ring-shaped section 174a serving as the end face of the cage 174 of the one-way clutch 107 in the axial direction.

The region A and the region C of both the end sections of the cylindrical section 161 of the output rotor 106 in the axial direction are used as the outer rings 182 of the rolling bearings 108, and the outer ring raceway faces 182a of the outer rings 182 are formed on the inner peripheral faces of the regions A and C. The cylindrical rollers 183 are rotatably disposed between the outer ring raceway face 182a and the inner ring raceway face 181a.

As shown in FIG. 9, the rotation transmission device 111 is equipped with a detection mechanism including an input side detection section (first detection section) 112 for detecting the rotation angles (absolute angles) of the input rotor 105 and the inner ring 171 and an output side detection section (second detection section) 113 for detecting the rotation angles (absolute angles) of the output rotor 106 and the outer ring 172. The input side detection section 112 is composed of a magnetic encoder and is equipped with a pulser ring 112a having N and S poles alternately magnetized in the circumferential direction and a magnetic detector 112b for detecting the magnetic change in the pulser ring 112a. The pulser ring 112a is installed on the outer peripheral face of the flange section 151 of the input rotor 105. Furthermore, the magnetic detector 112b is disposed on the outside of the pulser ring 112a in the radial direction with a space provided therebetween.

Similarly, the output side detection section 113 is also composed of a magnetic encoder and is equipped with a pulser ring 113a and a magnetic detector 113b. The pulser ring 113a is installed on the outer peripheral face of the flange section 162 of the output rotor 106. The magnetic detector 113b is disposed on the outside of the pulser ring 113a in the radial direction with a space provided therebetween.

The pulser rings 112a and 113a of the input side detection section 112 and the output side detection section 113 rotate together with the input rotor 105 and the output rotor 106, respectively. The N and S poles pass alternately in the vicinity of the detection faces of the magnetic detectors 112b and 113b by virtue of the rotation of the pulser rings 112a and 113a.

The magnetic detectors 112b and 113b, each incorporating a magnetic detection element, such as a Hall element, convert the change in the direction of the magnetic flux due to the rotation of the pulser rings 112a and 113a into electric signals, and output the electric signals. Hence, the output signals of the magnetic detectors 112b and 113b correspond to the rotation angles of the input rotor 105 and the output rotor 106. The output signals of the magnetic detectors 112b and 113b are then transmitted sequentially to a control unit 90 (see FIG. 8).

As shown in FIG. 8, the control unit 90 is equipped with a calculation section 91, a determination section 92 and a transmission section 93 as function sections serving as components of the rotation transmission device 111 (or the detection mechanism). The output signal of the input side detection section 112 and the output signal of the output side detection section 113 are input to the calculation section 91, and the calculation section 91 obtains the relative rotation angle between the input rotor 105 and the output rotor 106 from the respective output signals. The output signals of the input side detection section 112 and the output side detection section 113 can be transmitted to the calculation section 91 by wire or wirelessly.

Figure 11:
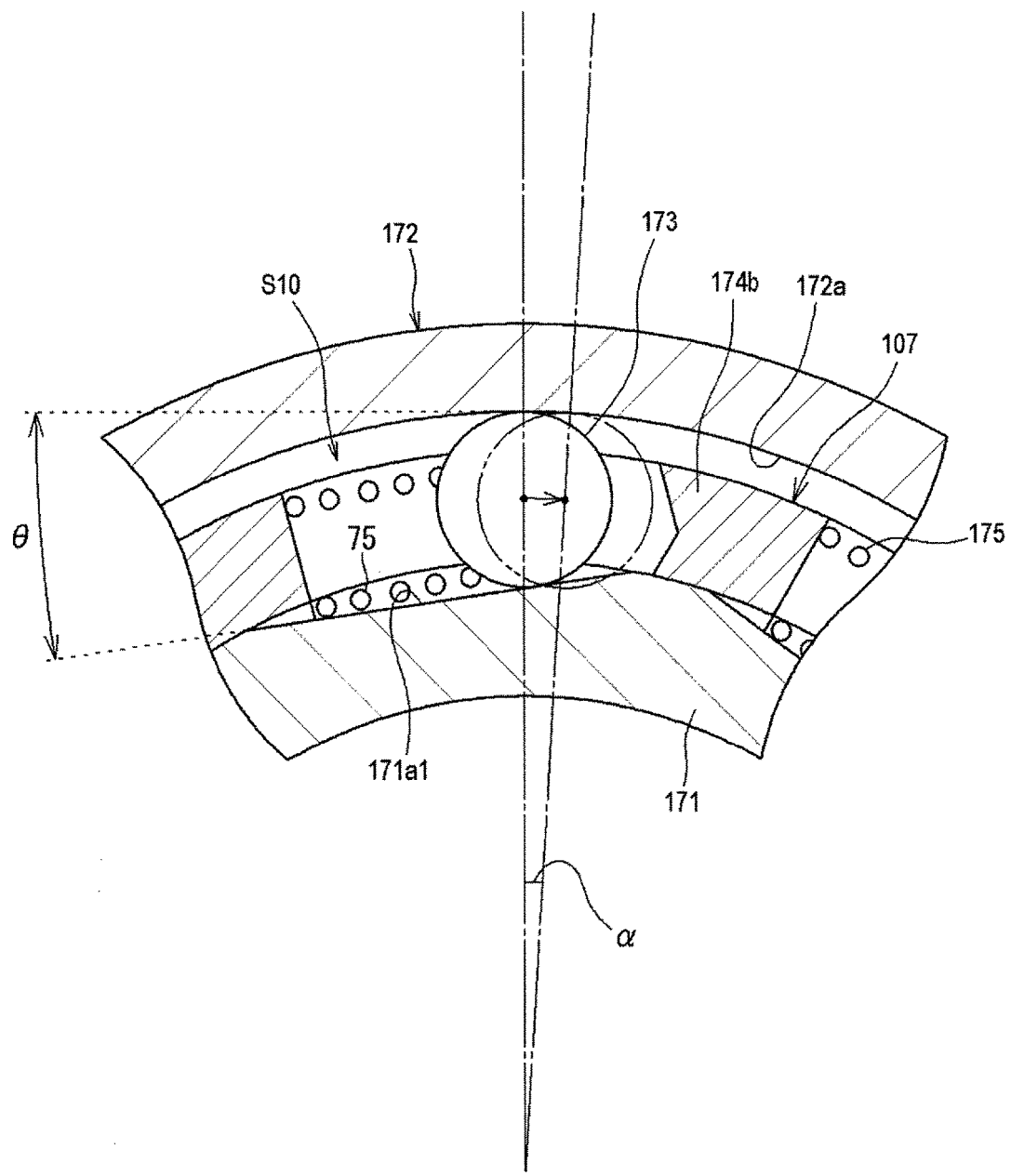
FIG. 11 is an enlarged cross-sectional view showing part of the one-way clutch in the wind power generation device.

In the case that the input rotor 105 and the output rotor 106 rotate integrally at the same rotation speed, the output signals of the input side detection section 112 and the output side detection section 113 become identical. In this state, when the power generation torque (load torque) for rotating the rotor 42 of the generator 4 increases, the roller 173 of the one-way clutch 107 moves to the narrower region of the wedge-shaped space S10 as indicated by an arrow in FIG. 11, and the rotation of the output rotor 106 is delayed from the rotation of the input rotor 105 at the time of the movement, whereby the two rotors slightly rotate relative to each other. Furthermore, the angle of this relative rotation, that is, the torsion angle α between the input rotor 105 and the output rotor 106, can be obtained as the difference between the output signal of the input side detection section 112 and the output signal of the output side detection section 113.

The change amount of the power generation torque and the torsion angle α between the input rotor 105 and the output rotor 106 obtained by the calculation section 91 are respectively input to the determination section 92 of the control unit 90. The change amount of the power generation torque can be converted from the change amount of the output current of the generator 4. The determination section 92 then determines the abrasion of the inner peripheral face 172a of the outer ring 172 and the cam face 171a1 of the inner ring 171 with which the roller 173 is engaged, that is, the abrasion states of the engaged faces 172a and 171a1 of the outer ring 172 and the inner ring 171, on the basis of the torsion angle α depending on the change amount of the power generation torque.

The torsion angle α between the input rotor 105 and the output rotor 106 changes depending on the wedge angle θ (see FIG. 11) of the wedge-shaped space S10. In addition, the wedge angle θ becomes larger as the abrasion of the engaged faces 172a and 171a1 of the outer ring 172 and the inner ring 171 proceeds. Hence, it is possible to say that the torsion angle α becomes larger as the abrasion of the engaged faces 172a and 171a1 proceeds. In this embodiment, the abrasion state of the engaged face 172a is determined by comparing the torsion angle α depending on the change amount of the power generation torque with a predetermined threshold value. A specific example will be described below.

Figure 12:
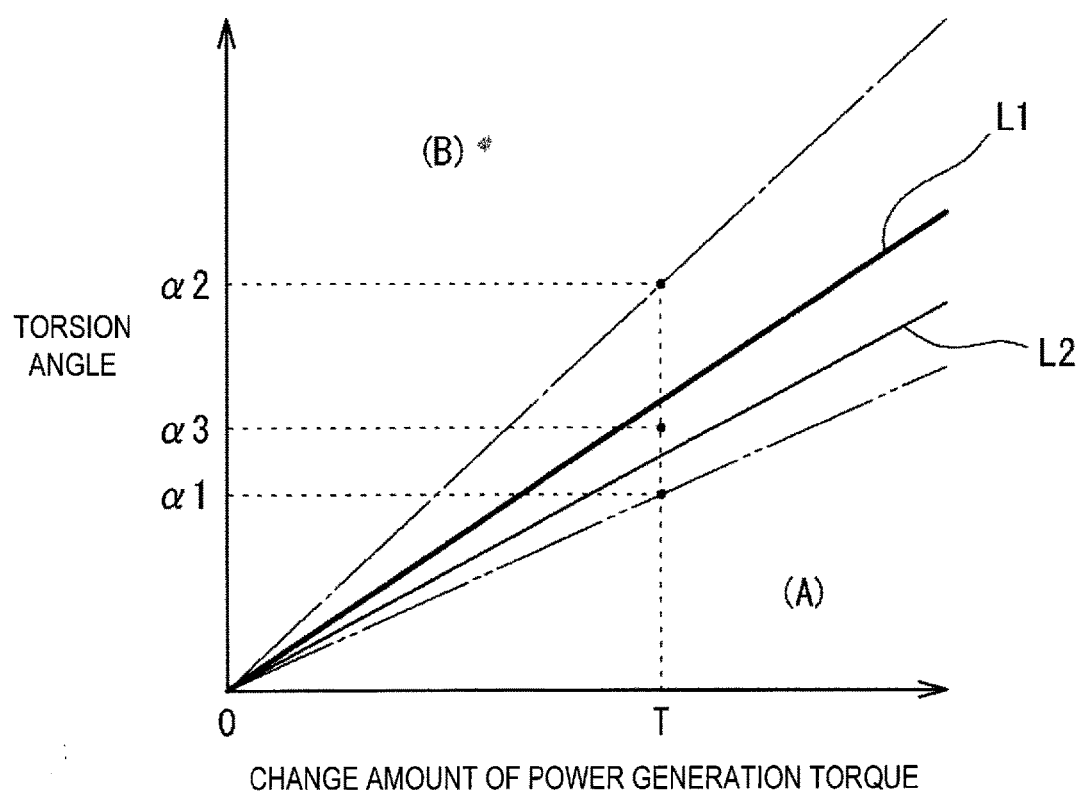
FIG. 12 is a graph showing the relationship between the change amount of a power generation torque and a torsion angle.

FIG. 12 is a graph showing the relationship between the change amount of the power generation torque and the torsion angle α. A first threshold value line L1 for setting the threshold value is set in this graph. For example, in the case that the change amount of the power generation torque is T, if the torsion angle α at this time is in a region (A) lower than the first threshold value line L1 (in the case of a torsion angle α1), the determination section 92 determines that the abrasion of the engaged faces 172a and 171a1 is small; if the torsion angle α is in a region (B) higher than the first threshold value line L1 (in the case of a torsion angle α2), the determination section 92 determines that the abrasion of the engaged faces 172a and 171a1 is large. For example, if the torsion angle α is above the first threshold value line L1, it is possible to determine that there is a high risk of failure.

The transmission section 93 of the control unit 90 sequentially transmits the determination result of the determination section 92 to the operation monitoring device (operation monitoring facility) 20 provided outside the wind power generation device 101. The operation monitoring device 20 monitors the operation state, the presence/absence of problem occurrence, etc. of the wind power generation device 101 at all times and also monitors the abrasion state of the engaged faces 172a and 171a1 of the one-way clutch 107 on the basis of the determination result transmitted from the control unit 90. In the case that it is determined that the abrasion of the engaged faces 172a and 171a1 is large by the determination section 92, the determination result is notified to the operator who operates the operation monitoring device 20. Hence, before power generation efficiency becomes low or before the wind power generation device 101 fails, the wind power generation device 101 can be stopped, and countermeasures, such as the replacement, repair, etc. of the one-way clutch 107, can be carried out. The transmission section 93 can transmit the determination result by wire or wirelessly. The wind power generation device 101 may be stopped by automatic control depending on the determination result of the determination section 92.

Moreover, the determination result of the determination section 92 may be transmitted from the transmission section 93 or the operation monitoring device 20 to a communication facility installed in a component manufacturer. In this case, the information indicating that component replacement is necessary can be transmitted quickly to the component manufacturer, whereby the preparation for component replacement can be hastened, the operation stop time of the wind power generation device 101 can be shortened, and the profitability thereof can be raised.

Furthermore, as shown in FIG. 12, a second threshold line L2 may also be set in addition to the first threshold value line L1. This second threshold line L2 indicates preparation time or preparation consideration time for component replacement. Hence, for example, in the case that the torsion angle α is in the range between the first threshold value line L1 and the second threshold line L2 (in the case of a torsion angle α3), it is possible to determine that the abrasion state of the engaged faces 172a and 171a1 is in a state in which the one-way clutch 107 does not fail immediately but it is preferable that component replacement should be prepared. Moreover, it is preferable that the determination result of the determination section 92 should be transmitted from the transmission section 93 or the operation monitoring device 20 to the communication facilities or the like of various management companies and component manufacturers relating to the wind power generation device 101. In this case, for example, a component manufacturer having received the determination result can sound out a management company or the like as to whether a replacement component will be ordered. Hence, the ordering work for the replacement component can be performed smoothly and the replacement work can also be performed quickly. Consequently, the operation stop time of the wind power generation device 101 can be shortened and the profitability thereof can be raised. Moreover, in the case that more wind power generation devices are managed, they can be managed easily.

Fifth Embodiment

Figure 13:
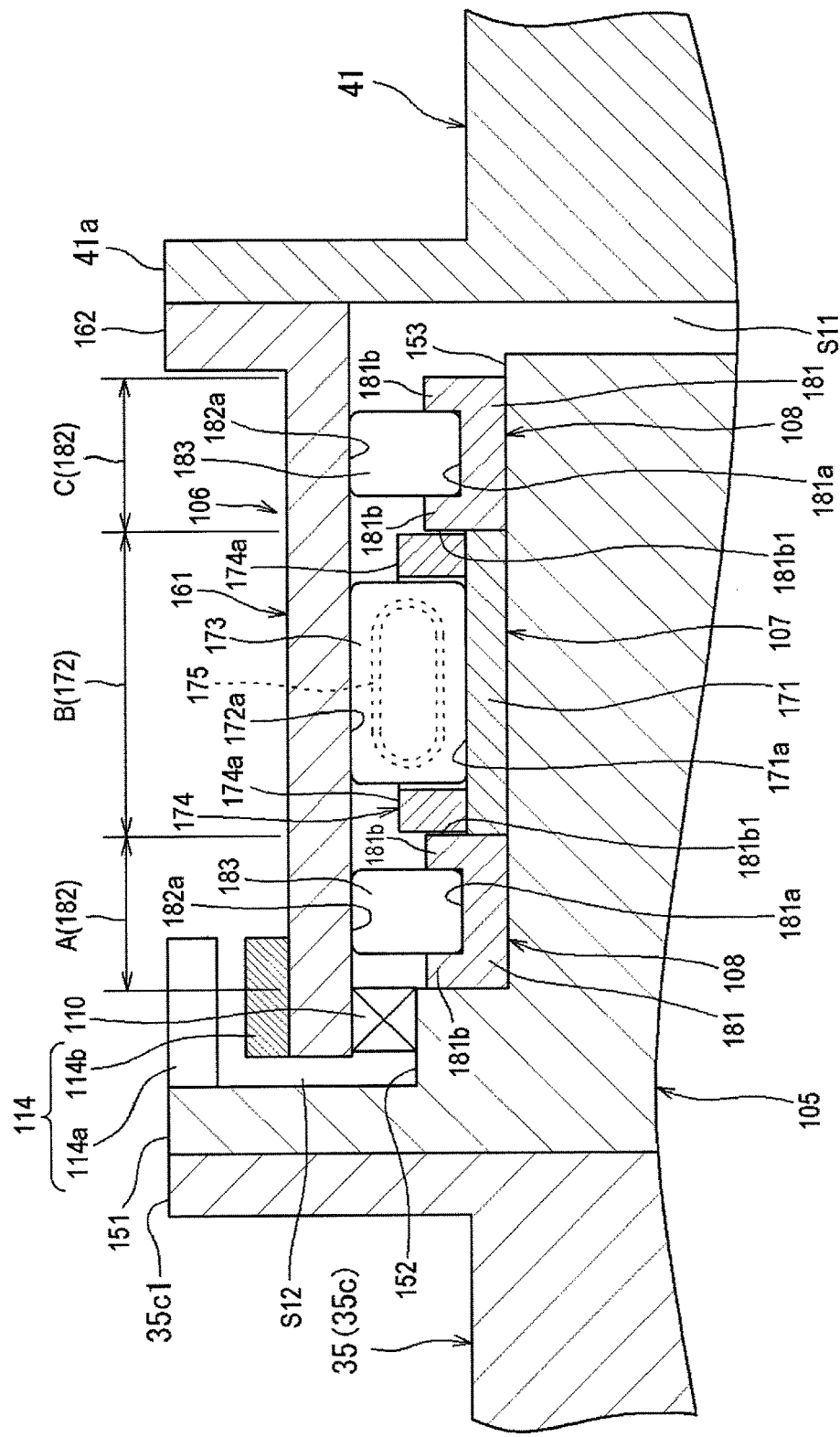
FIG. 13 is a cross-sectional view showing the connection portion between the output shaft of a speed increaser and the input shaft of a generator in a wind power generation device according to a fifth embodiment of the present invention.

FIG. 13 is a cross-sectional view showing the connection portion between the output shaft of the speed increaser and the input shaft of the generator in a wind power generation device according to a fifth embodiment of the present invention.

A rotation transmission device 111 according to this embodiment is equipped with a detection mechanism having a single detection section 114 for directly detecting the relative rotation angle between the input rotor 105 and the output rotor 106. This detection section 114 is composed of, for example, an encoder as in the case of the fourth embodiment and has a detector 114a installed on the input rotor 105 and a pulser ring 114b installed so as to be opposed to the inner peripheral side thereof and on the side of the output rotor 106. When the input rotor 105 and the output rotor 106 rotate relatively, the detection section 114 can directly detect the angle (torsion angle) of the relative rotation. Hence, in this embodiment, the number of the detection sections can be reduced, and the calculation section 91 (see FIG. 8) for obtaining the torsion angle according to the fourth embodiment is not necessary, whereby the detection mechanism can be configured simply and inexpensively. Since the other configurations are the same as those according to the fourth embodiment, the detailed descriptions thereof are omitted.

The present invention can be modified appropriately without being limited by the above-mentioned embodiments. For example, in the above-mentioned embodiments, each of the detection sections 112 to 114 constituting the detection mechanism is not limited to a magnetic encoder, but an optical encoder can be used. Furthermore, other rotation angle detectors, such as a resolver and a potentiometer, can be selected appropriately and used.

Although each of the above-mentioned embodiments has been configured so that the detection result of the detection section and the determination result of the determination section are transmitted sequentially, such information may be stored by a recording device, such as a data logger, and may be fetched from the recording device periodically.

Although the detection mechanism obtains the torsion angle generated by the change in the power generation torque of the generator 4 in the above-mentioned embodiments, the detection mechanism may obtain the torsion angle generated due to the inertia torque generated when the rotation of the rotor of the generator 4 is accelerated or decelerated. Moreover, the detection of the torsion angle using the detection mechanism may be performed, for example, during the normal operation of the wind power generation device 101 or during maintenance or the like.

What's more, although the determination section 92 of the control unit 90 may be configured so as to determine the abrasion state of the engaged faces 172a and 171a1 at all times, the detection section may be configured so as to determine the abrasion state in the case that specific conditions have been satisfied. For example, while the state in which wind speed is the rotation start speed of the main spindle 2 and the rotation thereof is stable is used as the standard state, the detection section may be configured so as to determine the abrasion state on the basis of the torsion angle generated when the load torque is increased by a predetermined amount from the load torque in the standard state. Erroneous determination due to variation in conditions can be suppressed by determining the abrasion state using the change amount of the load torque and the torsion angle obtained at the time when such specific conditions are satisfied.

The present application is based on Japanese Patent Application (patent application 2013-167421) filed on Aug. 12, 2013 and Japanese Patent Application (patent application 2013-167449) filed on Aug. 12, 2013, and the contents thereof are herein incorporated by reference.

DESCRIPTION OF REFERENCE SIGNS 1, 101: wind power generation device, 2: main spindle, 3: speed increaser, 4: generator, 7, 107: one-way clutch, 11, 111: rotation transmission device, 13: strain sensor (measurement section), 15: acquisition section, 16: electric load adjustment section, 18: transmission section, 20: operation monitoring device, 21: gap sensor (measurement section), 35: output shaft, 41: drive shaft (input shaft), 71: outer ring, 71a: inner peripheral face, 71a1: cam face, 72: inner ring, 72a: outer peripheral face, 72a1: cam face, 73: engagement element (roller, sprag), S: wedge-shaped space, 112: input side detection section (second detection section), 113: output side detection section (first detection section), 114: detection section, 171: inner ring, 171a: cam face (engaged face), 172: outer ring, 172a: inner peripheral face (engaged face), 91: calculation section, 92: detection section, 93: transmission section, S10: wedge-shaped space, α: torsion angle

The invention claimed is:
1. A rotation transmission device, comprising:
a one-way clutch that is provided between an output shaft of a speed increaser, which increases rotation of a main spindle in a wind power generation device, and an input shaft of a generator, to which rotation of the output shaft is input so as to generate electric power, the one-way clutch making a connection between the output shaft and the input shaft so as to be rotatable integrally in a state in which a rotation speed of the output shaft is higher than a rotation speed of the input shaft, and which cuts off the connection between the output shaft and the input shaft in a state in which the rotation speed of the output shaft is lower than the rotation speed of the input shaft;

a measurement section that measures a state of the one-way clutch, which changes depending on a load exerted to the one-way clutch; and
an acquisition section that acquires the load exerted to the one-way clutch on a basis of a measurement result of the measurement section,
wherein:
the one-way clutch comprises:
an inner ring and an outer ring; and
a plurality of engagement elements disposed between the inner ring and the outer ring,
the engagement elements are engaged with the inner ring and the outer ring to make the connection between the output shaft and the input shaft so as to be rotatable integrally, and are released from engagement to cut off the connection, and
the measurement section comprises a strain sensor that measures a distortion generated in the inner ring or the outer ring by the engagement of the engagement elements.

2. A rotation transmission device comprising:
a one-way clutch that is provided between an output shaft of a speed increaser, which increases rotation of a main spindle in a wind power generation device, and an input shaft of a generator, to which rotation of the output shaft is input so as to generate electric power, the one-way clutch making a connection between the output shaft and the input shaft so as to be rotatable integrally in a state in which a rotation speed of the output shaft is higher than a rotation speed of the input shaft, and which cuts off the connection between the output shaft and the input shaft in a state in which the rotation speed of the output shaft is lower than the rotation speed of the input shaft;
a measurement section that measures a state of the one-way clutch which changes depending on a load exerted to the one-way clutch; and
an acquisition section that acquires the load exerted to the one-way clutch on a basis of a measurement result of the measurement section,
wherein:
the one-way clutch comprises:
an inner ring and an outer ring; and
a plurality of engagement elements disposed between the inner ring and the outer ring,
the engagement elements are engaged with the inner ring and the outer ring to make the connection between the output shaft and the input shaft so as to be rotatable integrally, and are released from engagement to cut off the connection, and
wherein the measurement section comprises a gap sensor that measures a movement amount of the engagement element in a circumferential direction when the engagement element is engaged with the inner ring and the outer ring.

3. The rotation transmission device according to claim 1, wherein the one-way clutch comprises cam faces on an inner peripheral face of the outer ring or an outer peripheral face of the inner ring to form wedge-shaped spaces between the inner ring and the outer ring.

4. The rotation transmission device according to claim 2, wherein the one-way clutch comprises sprags serving as the engagement elements.

5. A wind power generation device comprising:
a speed increaser that increases rotation of a main spindle rotated by wind power, and that outputs the rotation from an output shaft;
a generator to which the rotation of the output shaft is input through an input shaft thereof to generate electric power;
the rotation transmission device according to claim 1; and
an adjustment section that adjusts an electric load of the generator depending on the load acquired by the acquisition section of the rotation transmission device.

6. The wind power generation device according to claim 5, further comprising:
a transmission section that transmits information indicating the state of the one-way clutch or information indicating the load exerted to the one-way clutch to an outside of the wind power generation device.

7. A rotation transmission device comprising:
a one-way clutch that is provided between an output shaft of a speed increaser, which increases rotation of a main spindle rotated by wind power and which outputs the rotation from the output shaft, and an input shaft of a generator, to which the rotation of the output shaft is input so as to generate electric power,
wherein:
the one-way clutch comprises:
an inner ring provided on one of the output shaft and the input shaft;
an outer ring provided on the other of the output shaft and the input shaft; and
rollers disposed in wedge-shaped spaces between the inner ring and the outer ring,
the one-way clutch makes a connection between the output shaft and the input shaft so as to be rotatable integrally by engaging the rollers with the inner ring and the outer ring in a case in which a rotation speed of the output shaft is higher than a rotation speed of the input shaft, and cuts off the connection by releasing engagement in a case in which the rotation speed of the output shaft is lower than the rotation speed of the input shaft,
the rotation transmission device further comprises a detection mechanism that detects a torsion angle between the inner ring and the outer ring caused by a change in a load torque of the generator, and
the detection mechanism comprises a detection section that directly detects a change in an angle due to a relative rotation between the inner ring and the outer ring.

8. The rotation transmission device according to claim 7, further comprising:
a determination section that determines an abrasion state of the inner ring and the outer ring of the one-way clutch on a basis of the torsion angle depending on a change amount of the load torque.

9. The rotation transmission device according to claim 7, wherein the detection mechanism comprises:
a first detection section that detects an absolute angle of the inner ring;
a second detection section that detects an absolute angle of the outer ring; and
a calculation section that obtains a difference between detection values of the first and second detection sections.

10. The rotation transmission device according to claim 8, further comprising:
a transmission section that transmits a determination result of the determination section to an outside of the wind power generation device.

11. A wind power generation device comprising:
a speed increaser that increases rotation of a main spindle rotated by wind power, and that outputs the rotation from the output shaft thereof;
a generator to which the rotation of the output shaft is input through an input shaft thereof to generate electric power; and
the rotation transmission device according to claim 7.

12. The rotation transmission device according to claim 2, wherein the one-way clutch comprises cam faces on an inner peripheral face of the outer ring or an outer peripheral face of the inner ring to form wedge-shaped spaces between the inner ring and the outer ring.

13. The rotation transmission device according to claim 8, wherein the detection mechanism comprises:
   a first detection section that detects an absolute angle of the inner ring;
   a second detection section that detects an absolute angle of the outer ring; and
   a calculation section that obtains a difference between detection values of the first and second detection sections.

14. The rotation transmission device according to claim 3, wherein the strain sensor is provided on an inner peripheral face of the inner ring at an inside of the cam face of the inner ring in a radial direction or is provided on an outer peripheral face of the outer ring at an outside of the cam face of the outer ring in the radial direction.

15. The rotation transmission device according to claim 2, wherein the gap sensor is provided to oppose the engagement element in the circumferential direction, and measures a gap between the engagement element and the gap sensor in the circumferential direction.

16. The rotation transmission device according to claim 7, wherein the detection section comprises an encoder, the encoder comprising:
   a detector attached to a first shaft, which is one of the output shaft and the input shaft, or a first rotor integrally rotatable with the first shaft; and
   a pulser ring attached to a second shaft, which is the other of the output shaft and the input shaft, or a second rotor integrally rotatable with the second shaft, so as to oppose the detector.

* * * * *